US011279601B2

(12) United States Patent
Kaybidge

(10) Patent No.: US 11,279,601 B2
(45) Date of Patent: Mar. 22, 2022

(54) HOISTING AND TENSIONING BEARING SAVER

(71) Applicant: National Oilwell Varco, L.P., Houston, TX (US)

(72) Inventor: Reece William Kaybidge, Sprucegrove (CA)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 243 days.

(21) Appl. No.: 15/477,733

(22) Filed: Apr. 3, 2017

(65) Prior Publication Data

US 2018/0282137 A1    Oct. 4, 2018

(51) Int. Cl.
*B66D 3/00* (2006.01)
*B66D 3/06* (2006.01)
(Continued)

(52) U.S. Cl.
CPC .............. *B66D 3/08* (2013.01); *E21B 19/00* (2013.01); *E21B 19/006* (2013.01);
(Continued)

(58) Field of Classification Search
CPC ...... B66D 3/04; B66D 3/08; B66D 2700/026; B66D 2700/028; F16H 55/36–566;
(Continued)

(56) References Cited

U.S. PATENT DOCUMENTS 432,701 A    7/1890  Grimm
639,762 A   12/1899  Painter
(Continued)

FOREIGN PATENT DOCUMENTS

CA    2287676 A1    6/2000
CA    2874138 A1   10/2015
(Continued)

OTHER PUBLICATIONS

"Assembly, Wire Line Guide Roller Type", internal Varco B.J. Drilling Systems drawing for fabrication purposes, dated Nov. 15, 1990 (1 page).

(Continued)

*Primary Examiner* — Frederick L Lagman
*Assistant Examiner* — Stacy N Lawson
(74) *Attorney, Agent, or Firm* — Schwegman Lundberg & Woessner, P.A.

(57) ABSTRACT

A sheave assembly for use in a handling system or tensioning system, the sheave assembly having one or more sheaves arranged about a shaft and cone sub-assembly. The shaft and cone sub-assembly may include one or more pairs of bearing cones configured to interface with a plurality of bearing rollers to facilitate rotation of the one or more sheaves about the shaft and cone sub-assembly. The shaft and cone sub-assembly may be configured to be arranged in a fixed rotational position during handling or tensioning operations. The shaft and cone sub-assembly may further be configured to be rotated or repositioned about a central, longitudinal axis of the sub-assembly. The shaft and cone sub-assembly may be configured to rotate independent of the sheave(s) so as to reposition the one or more pairs of cones with respect to applied loading on the sheave assembly from the handling or tensioning operations.

10 Claims, 15 Drawing Sheets

(51) Int. Cl.
  *E21B 19/00* (2006.01)
  *B66D 3/08* (2006.01)
  *F16C 19/54* (2006.01)
  *F16C 25/06* (2006.01)
  *F16H 55/36* (2006.01)

(52) U.S. Cl.
  CPC ............ *F16C 19/541* (2013.01); *F16C 25/06* (2013.01); *F16H 55/36* (2013.01); *B66D 2700/028* (2013.01)

(58) Field of Classification Search
  CPC ...... E21B 19/00; E21B 19/004; E21B 19/006; E21B 19/02; F16C 19/54–548; F16C 25/00; F16C 25/02; F16C 25/06
  See application file for complete search history.

(56) References Cited

U.S. PATENT DOCUMENTS

| | | |
|---|---|---|
| 829,898 A | 8/1906 | Schultz |
| 1,049,170 A | 12/1912 | Thomas |
| 1,362,778 A | 12/1920 | Castino |
| 1,369,319 A | 2/1921 | Guillaume |
| 1,471,583 A | 10/1923 | Andersen |
| 1,509,906 A | 9/1924 | Goss |
| 1,574,799 A * | 3/1926 | Dierks ............... B66D 3/06 384/588 |
| 1,713,586 A * | 5/1929 | Wright ............... B66D 3/06 254/404 |
| 1,797,406 A * | 3/1931 | Erlewine ............ B66D 3/06 254/393 |
| 1,824,652 A * | 9/1931 | Boykin, Jr. ........ B66D 3/06 254/393 |
| 1,849,924 A | 3/1932 | Hall |
| 1,896,415 A | 2/1933 | McDonald |
| 2,010,362 A * | 8/1935 | Frauenthal ......... F16C 19/28 384/99 |
| 2,187,960 A | 1/1940 | Allyn |
| 2,190,880 A | 2/1940 | Moss |
| 2,238,398 A | 4/1941 | Reed |
| 2,260,345 A * | 10/1941 | Smith ................. E21B 19/02 254/404 |
| 2,282,633 A * | 5/1942 | Young ............... B66D 3/06 254/404 |
| 2,316,727 A | 4/1943 | Thompson |
| 2,329,529 A | 9/1943 | Gwinn |
| 2,359,919 A * | 10/1944 | Johnson ............. B66D 3/06 254/394 |
| 2,408,899 A * | 10/1946 | Wright ............... B66D 3/04 384/588 |
| 2,480,488 A | 8/1949 | MacClatchie |
| 2,486,071 A | 10/1949 | Smith |
| 2,495,039 A | 1/1950 | Tuel |
| 2,529,486 A | 11/1950 | Clarkson |
| 2,552,924 A | 5/1951 | Athy et al. |
| 2,565,693 A | 8/1951 | Lewis |
| 2,657,011 A | 10/1953 | Slonneger |
| 2,657,905 A * | 11/1953 | Bennett .............. E21B 19/02 254/404 |
| 2,672,320 A * | 3/1954 | Minor ................ B66D 3/06 254/404 |
| 2,681,793 A | 6/1954 | Miller |
| 2,695,770 A | 11/1954 | Stone |
| 2,717,184 A * | 9/1955 | Amerman ........... B66D 3/06 384/475 |
| 2,730,795 A | 1/1956 | Bloss |
| 2,806,380 A | 9/1957 | Martin |
| 3,292,908 A | 12/1966 | Thompson |
| 3,295,832 A | 1/1967 | Fowler |
| 3,385,563 A | 5/1968 | Stinson, Jr. |
| 3,512,757 A | 5/1970 | Ostrom |
| 3,679,012 A * | 7/1972 | Haulotte ............ B66D 3/04 177/147 |
| 3,868,089 A | 2/1975 | Lindsey et al. |
| 3,934,482 A | 1/1976 | Byers |
| 3,951,235 A | 4/1976 | Acerbi |
| 4,018,422 A | 4/1977 | Bozeman, Jr. |
| RE29,493 E | 12/1977 | Crump |
| 4,069,921 A | 1/1978 | Raugulis et al. |
| 4,106,156 A | 8/1978 | Fisher et al. |
| 4,169,427 A | 10/1979 | Crump et al. |
| 4,177,685 A | 12/1979 | Delancey |
| 4,296,837 A | 10/1981 | Charlton |
| 4,301,995 A | 11/1981 | Niskin |
| 4,336,866 A | 6/1982 | Blanton, Jr. |
| 4,349,952 A | 9/1982 | Decker et al. |
| 4,413,981 A | 11/1983 | White et al. |
| 4,480,818 A | 11/1984 | Frank |
| 4,492,363 A | 1/1985 | Niskin |
| 4,498,558 A | 2/1985 | Bendahan |
| 4,862,996 A | 9/1989 | Chisholm |
| 4,936,549 A | 6/1990 | Ivanov et al. |
| 5,490,814 A | 2/1996 | Whitenight |
| 5,636,460 A * | 6/1997 | Dretzka ............. B66D 3/04 254/415 |
| 5,645,269 A | 7/1997 | Peterson |
| 5,941,653 A | 8/1999 | Cipriani |
| 5,984,586 A | 11/1999 | Wudtke |
| 6,041,476 A | 3/2000 | Denormand |
| 6,105,939 A | 8/2000 | Vance et al. |
| 6,234,277 B1 | 5/2001 | Kaczmarek |
| 6,471,191 B1 | 10/2002 | Rotzler et al. |
| 6,783,593 B2 | 8/2004 | Selcer et al. |
| 6,881,166 B1 | 4/2005 | Burkhardt et al. |
| 7,036,393 B2 | 5/2006 | Sakamaki |
| 7,175,163 B2 | 2/2007 | Blanc |
| 7,222,840 B1 | 5/2007 | Stepper |
| 7,475,867 B1 | 1/2009 | Romo |
| 7,798,471 B2 | 9/2010 | Christopher |
| 8,047,506 B2 | 11/2011 | Student et al. |
| 8,317,160 B2 | 11/2012 | Romo et al. |
| 8,398,057 B2 | 3/2013 | Tukachinsky |
| 8,485,951 B1 | 7/2013 | Adams |
| 8,511,645 B2 | 8/2013 | Taddei |
| 8,973,901 B2 | 3/2015 | Roodenburg et al. |
| 9,249,643 B2 | 2/2016 | Melancon |
| 10,557,540 B2 | 2/2020 | Ervin |
| 2004/0026676 A1 | 2/2004 | Smith et al. |
| 2005/0037880 A1 | 2/2005 | Yoshikawa |
| 2006/0000058 A1 | 1/2006 | Robertson |
| 2006/0231812 A1 | 10/2006 | Ziech et al. |
| 2007/0155562 A1 | 6/2007 | Stubenrauch |
| 2007/0278465 A1 | 12/2007 | Letellier |
| 2008/0067482 A1* | 3/2008 | Carlson .............. B66D 3/04 254/397 |
| 2008/0115414 A1 | 5/2008 | Hogan |
| 2008/0161141 A1 | 7/2008 | Joo et al. |
| 2009/0291793 A1 | 11/2009 | Marchesseault |
| 2010/0133046 A1 | 6/2010 | Allwardt et al. |
| 2011/0118067 A1 | 5/2011 | Bronson |
| 2012/0204851 A1 | 8/2012 | Mcpherson et al. |
| 2014/0027691 A1 | 1/2014 | Ilaka et al. |
| 2014/0048331 A1* | 2/2014 | Boutalbi ............ E21B 21/08 175/38 |
| 2014/0291030 A1 | 10/2014 | Urquhart |
| 2015/0083879 A1 | 3/2015 | Hoffend, III |
| 2015/0291403 A1 | 10/2015 | Ervin |
| 2015/0353331 A1 | 12/2015 | Krijnen |
| 2016/0122163 A1 | 5/2016 | Krijnen |

FOREIGN PATENT DOCUMENTS

| | | |
|---|---|---|
| CH | 641254 A5 | 2/1984 |
| CN | 202251826 U | 5/2012 |
| CN | 104976322 A | 10/2015 |
| DE | 1900707 A1 | 8/1970 |
| DE | 3426802 C1 | 2/1986 |
| EP | 1916450 | 4/2008 |
| EP | 2447573 A1 | 5/2012 |
| EP | 2933220 A1 | 10/2015 |
| GB | 261207 A | 11/1926 |
| GB | 285653 A | 2/1928 |

(56) References Cited

FOREIGN PATENT DOCUMENTS

| JP | 2000229789 A | 8/2000 |
|---|---|---|
| WO | WO-2013038432 A1 | 3/2013 |
| WO | 2018187030 | 10/2018 |

OTHER PUBLICATIONS

"Stabilizer Assembly", internal National Oilwell Varco drawing for fabrication purposes, dated Nov. 12, 2007 (1 page).
"Wire Line Guides Parts and Price List", Byron Jackson Tools, Inc. Oil Field Tools, Oil Field Rubber Products, and Oil Field Pumps Catalog, 1959 (3 pages).
International Search Report and Written Opinion for related PCT Application No. PCT/US2015/062896 dated Aug. 3, 2016 (12 pages).
International Search Report and Written Opinion for related PCT Application No. PCT/US2018/023321 dated Jun. 18, 2018 (16 pages).
International Search Report and Written Opinion for related PCT Application No. PCT/US2018/026660 dated Jul. 20, 2018 (14 pages).
"", Screen shots from Google.com image search,. (Mar. 24, 2014), 1 pg.
"U.S. Appl. No. 14/251,938, Advisory Action dated Jul. 16, 2019", 3 pgs.
"U.S. Appl. No. 14/251,938, Examiner Interview Summary dated Aug. 19, 2019", 3 pgs.
"U.S. Appl. No. 14/251,938, Examiner Interview Summary dated Dec. 26, 2017", 3 pgs.
"U.S. Appl. No. 14/251,938, Final Office Action dated Feb. 26, 2016", 7 pgs.
"U.S. Appl. No. 14/251,938, Final Office Action dated Apr. 6, 2018", 11 pgs.
"U.S. Appl. No. 14/251,938, Final Office Action dated Apr. 15, 2019", 9 pgs.
"U.S. Appl. No. 14/251,938, Final Office Action dated May 1, 2017", 9 pgs.
"U.S. Appl. No. 14/251,938, Non Final Office Action dated Sep. 20, 2018", 12 pgs.
"U.S. Appl. No. 14/251,938, Non Final Office Action dated Oct. 17, 2017", 13 pgs.
"U.S. Appl. No. 14/251,938, Non Final Office Action dated Oct. 22, 2015" 12 pgs.
"U.S. Appl. No. 14/251,938, Non Final Office Action dated Dec. 15, 2016", 9 pgs.
"U.S. Appl. No. 14/251,938, Notice of Allowabllity dated Dec. 2, 2019", 4 pgs.
"U.S. Appl. No. 14/251,938, Notice of Allowance dated Oct. 2, 2019", 8 pgs.
"U.S. Appl. No. 14/251,938, Response filed Jan. 17, 2018 to Non Final Office Action dated Oct. 17, 2017", 7 pgs.
"U.S. Appl. No. 14/251,938, Response filed Jan. 22, 2016 to Non Final Office Action dated Oct. 22, 2015", 9 pgs.
"U.S. Appl. No. 14/251,938, Response filed Mar. 15, 2017 to Non Final Office Action dated Dec. 15, 2016", 9 pgs.
"U.S. Appl. No. 14/251,938, Response filed May 26, 2016 to Final Office Action dated Feb. 26, 2016", 8 pgs.
"U.S. Appl. No. 14/251,938, Response filed Aug. 1, 2017 to Final Office Action dated May 1, 2017", 10 pgs.
"U.S. Appl. No. 14/251,938, Response filed Aug. 6, 2018 to Final Office Action dated Apr. 6, 2018", 7 pgs.
"U.S. Appl. No. 14/251,938, Response filed Dec. 19, 2018 to Non Final Office Action dated Sep. 20, 2018", 7 pgs.
"U.S. Appl. No. 14/251,938, Response filed Jun. 10, 2019 to Final Office Action dated Apr. 15, 2019", 8 pgs.
"U.S. Appl. No. 14/251,938, Response filed Sep. 13, 2019 to Advisory Action dated Jul. 16, 2019", 8 pgs.
"Chinese Application Serial No. 201510173708.1, Office Action dated Feb. 3, 2020", w/ English Translation, 15 pgs.
"Chinese Application Serial No. 201510173708.1, Office Action dated Apr. 11, 2018", with Concise Statement of Relevance, 8 pgs.
"Chinese Application Serial No. 201510173708.1, Office Action dated Jun. 2, 2020", w/ English translation, 6 pgs.
"Chinese Application Serial No. 201510173708.1, Office Action dated Jun. 3, 2019", w/ English translation, 14 pgs.
"Chinese Application Serial No. 201510173708.1, Office Action dated Dec. 5, 2018", w/ English Translation, 15 pgs.
"Chinese Application Serial No. 201510173708.1, Response filed Feb. 19, 2019 to Office Action dated Dec. 5, 2018", with machine translation, 21 pgs.
"Chinese Application Serial No. 201510173708.1, Response filed Apr. 17, 2020 to Office Action dated Feb. 3, 2020", with machine translation, 18 pgs.
"Chinese Application Serial No. 201510173708.1, Response filed Aug. 14, 2020 to Office Action dated Jun. 2, 2020", w/ English claims, 6 pgs.
"Chinese Application Serial No. 201510173708.1, Response filed Aug. 27, 2018 to Office Action dated Apr. 11, 2018", with machine translation, 15 pgs.
"Chinese Application Serial No. 201510173708.1, Response filed Oct. 17, 2019 to Office Action dated Jun. 3, 2019", with machine translation, 20 pgs.
"European Application Serial No. 15156151.1, Communication pursuant to Article 94(3) EPC dated Apr. 9, 2018", 6 pgs.
"European Application Serial No. 15156151.1, Communication pursuant to Article 94(3) EPC dated Aug. 22, 2016", 7 pgs.
"European Application Serial No. 15156151.1, Communication Pursuant to Article 94(3) EPC dated Oct. 2, 2019", 5 pgs.
"European Application Serial No. 15156151.1, Extended European Search Report dated Aug. 3, 2015", 7 pgs.
"European Application Serial No. 15156151.1, Response filed Feb. 3, 2020 to Communication Pursuant to Article 94(3) EPC dated Oct. 2, 2019", 9 pgs.
"European Application Serial No. 15156151.1, Response filed Apr. 21, 2016 to Extended European Search Report dated Aug. 3, 2015", 33 pgs.
"European Application Serial No. 15156151.1, Response filed Aug. 9, 2018 to Communication pursuant to Article 94(3) EPC dated Apr. 9, 2018", 6 pgs.
"European Application Serial No. 15156151.1, Response filed Dec. 19, 2016 to Communication pursuant to Article 94(3) EPC dated Aug. 22, 2016", 10 pgs.
"Gulf Cooperation Council Application Serial No. GC 2018-35071, Examination Report dated May 28, 2020", 3 pgs.
Shehab, Khaled Mohamed, "Traveling Block and Crown Sheaves", Drilling Ahead World Oilfield Network, [Online] Retrieved from the internet: <http://www.drillingahead.com/group/hse-drilling/forum/topics/traveling-block-and-crown-sheaves>, (Apr. 15, 2012), 15 pgs.
"Canadian Application Serial No. 2,874,138, Office Action dated Dec. 10, 2020", 4 pgs.
"Canadian Application Serial No. 2,874,138, Response filed Apr. 1, 2021 to Office Action dated Dec. 10, 2020", 19 pgs.
"European Application Serial No. 15156151.1, Communication Pursuant to Article 94(3) EPC dated Apr. 15, 2021", 7 pgs.
"European Application Serial No. 15156151.1, Response filed Jul. 12, 2021 to Communication Pursuant to Article 94(3) EPC dated Apr. 15, 2021", 13 pgs.
"United Kingdom Application Serial No. 1914553.1, Examination Report dated Oct. 6, 2021", 10 pgs.

\* cited by examiner

HOISTING AND TENSIONING BEARING SAVER

FIELD OF THE INVENTION

The present disclosure relates to sheave assemblies for use in handling or tensioning lines, ropes, cables, or other flexible elongate tensile elements. Particularly, the present disclosure relates to devices, systems, and methods for extending the life of sheave bearing systems. More particularly, the present disclosure relates to devices, systems, and methods for rotating bearing cones in a sheave assembly, so as to reposition the cones with respect to loading from handling or tensioning operations.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Lifting assemblies using handling lines, ropes, cables, or other flexible elongate tensile elements commonly rely on one or more sheaves or pulleys for guiding the line through a portion of the assembly. In some cases, for example, lifting assemblies found on cranes and other material handling systems may include crown blocks, travelling blocks, snatch blocks, guides, and/or other portions configured to control the position of the line or cable. These devices may each include one or more sheaves for receiving and guiding the line as it passes through and/or over the device and/or changes direction as it passes through the device. Some such sheaves may include, for example, traveling block sheaves, crown cluster sheaves, heave compensator sheaves, tensioning sheaves, and/or slingshot substructure raising sheaves. Similarly, tensioning systems, such as marine riser tensioning systems or other tensioning systems, commonly rely on one or more sheaves or pulleys for maintaining tension in one or more lines. In a tensioning system, one or more lines may be reeved around one or more sheaves in order to maintain tension in the line(s). Sheaves of a handling system and/or tensioning system may be designed to rotate about an axle, shaft, or other element passing through the center of the sheave, in order to alter the direction of the handling line, rope, cable, or the like. Such sheaves may be arranged on a bearing assembly, having bearing cones, bearing cups, and/or bearing rollers, together configured to facilitating rotation of the sheave about the axis or shaft.

Over time, a sheave bearing assembly may wear from load forces on the sheave. In some cases, due to application of loading on the sheave, a sheave bearing assembly may wear at an uneven rate, such that some bearing rollers, cones, and/or cups, or portions thereof, within the bearing assembly may experience more wear than others. In this way, when a portion or segment of the bearing assembly subjected to higher loading nears or reaches a point of failure, other portions or segments of the bearing assembly subjected to reduced loading may exhibit substantially less wear. As a portion of the bearing assembly becomes worn, sheaves may begin to wobble or rotate unevenly or with increased friction, which may affect lifting and/or tensioning operations or lead to safety concerns.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a sheave assembly having a shaft and cone sub-assembly configured to rotate about a central axis. The sub-assembly may have a sheave shaft configured to be arranged at a center of one or more sheaves. The sub-assembly may further have one or more pairs of bearing cones arranged about the sheave shaft, each pair of bearing cones configured to interface with a plurality of bearing rollers. The shaft and cone sub-assembly may be configured to rotate about the central axis independent of the one or more sheaves. In some embodiments, the sheave assembly may have a spanner coupled to the shaft and cone sub-assembly and configured for rotating the sub-assembly about the central axis. Moreover, the sheave assembly may have one or more sheaves arranged about the shaft and cone sub-assembly, each sheave corresponding with a bearing cone. In some embodiments, a plurality of bearing rollers may be arranged between each sheave and its corresponding pair of bearing cones. In some embodiments, the shaft and cone sub-assembly may have an inner endcap coupled to an end of the sheave shaft and configured to hold the one or more pairs of bearing cones in a fixed position with respect to the sheave shaft. The sheave assembly may additionally have an outer endcap coupled to an end of the shaft and cone sub-assembly and configured to prevent undesired rotation of the shaft and cone sub-assembly during handling operations. The shaft and cone sub-assembly may, in some embodiments, have a plunger configured to engage with one or more corresponding openings or grooves to limit rotation of the shaft and cone sub-assembly. The plunger may be a ratcheting plunger that allows one-directional rotation of the shaft and cone sub-assembly.

The present disclosure, in another embodiment, relates to a drill rig having a mast and a sheave assembly. The sheave assembly may have a shaft and cone sub-assembly configured to rotate about a central axis. The sub-assembly may include a sheave shaft configured to be arranged at a center of one or more sheaves. The sub-assembly may further include one or more pairs of bearing cones arranged about the sheave shaft, each pair of bearing cones configured to interface with a plurality of bearing rollers. Moreover, the shaft and cone sub-assembly may be configured to rotate independent of the one or more sheaves. In some embodiments, the sheave assembly may be one of a crown block and a traveling block. The sheave assembly may include a spanner coupled to the shaft and cone sub-assembly and configured for rotating the sub-assembly about the central axis. Moreover, the sheave assembly may have one or more sheaves arranged about the shaft and cone sub-assembly, each sheave corresponding with a bearing cone. The sheave assembly may also have a plurality of bearing rollers arranged between each sheave and its corresponding pair of bearing cones. The shaft and cone sub-assembly may have an inner endcap coupled to an end of the sheave shaft and configured to hold the one or more pairs of bearing cones in a fixed position with respect to the sheave shaft. In some embodiments, the sheave assembly may be part of a handling system, or may be part of a tensioning system.

The present disclosure, in another embodiment, relates to a method of extending the life of one or more bearing cones arranged in a sheave assembly. The method may include arranging a shaft and cone sub-assembly of the sheave assembly through one or more sheaves and in a first rotational position about a central axis of rotation. The method may additionally include assessing an amount of wear on the one or more bearing cones, and rotating the shaft and cone sub-assembly about the central axis of rotation, without rotating the one or more sheaves, to a second rotational position. In some embodiments, rotating the shaft and cone sub-assembly may include rotating the sub-assembly approximately 90 degrees. In some embodiments, the method may include reserving a final rotational position in case of failure. Rotating the shaft and cone sub-assembly may additionally include decoupling an outer endcap from the shaft and cone sub-assembly, and pushing or pulling a spanner coupled to the shaft and cone sub-assembly.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to a novel and advantageous devices, systems, and methods for extending the life of bearing systems within a sheave assembly by rotating bearing cones in the sheave assembly, so as to reposition the cones with respect to loading from handling operations. In particular, the present disclosure relates to a sheave assembly for use in a handling system, the sheave assembly having one or more sheaves arranged about a shaft and cone sub-assembly. The shaft and cone sub-assembly may include one or more bearing cones configured to interface with a plurality of bearing rollers to facilitate rotation of the one or more sheaves about the shaft and cone sub-assembly. The shaft and cone sub-assembly may be configured to be arranged in a fixed rotational position during handling operations. The shaft and cone sub-assembly may further be configured to be rotated or repositioned about a central, longitudinal axis of the sub-assembly. The shaft and cone sub-assembly may be configured to rotate independent of the sheave(s) so as to reposition the one or more cones with respect to applied loading on the sheave assembly from the handling operations. The present disclosure additionally relates to a method of extending the life of one or more bearing cones of a sheave assembly by rotating the cones independent of the sheaves when a predetermined amount of wear is detected on the cone(s) at a point of loading.

Figure 1:
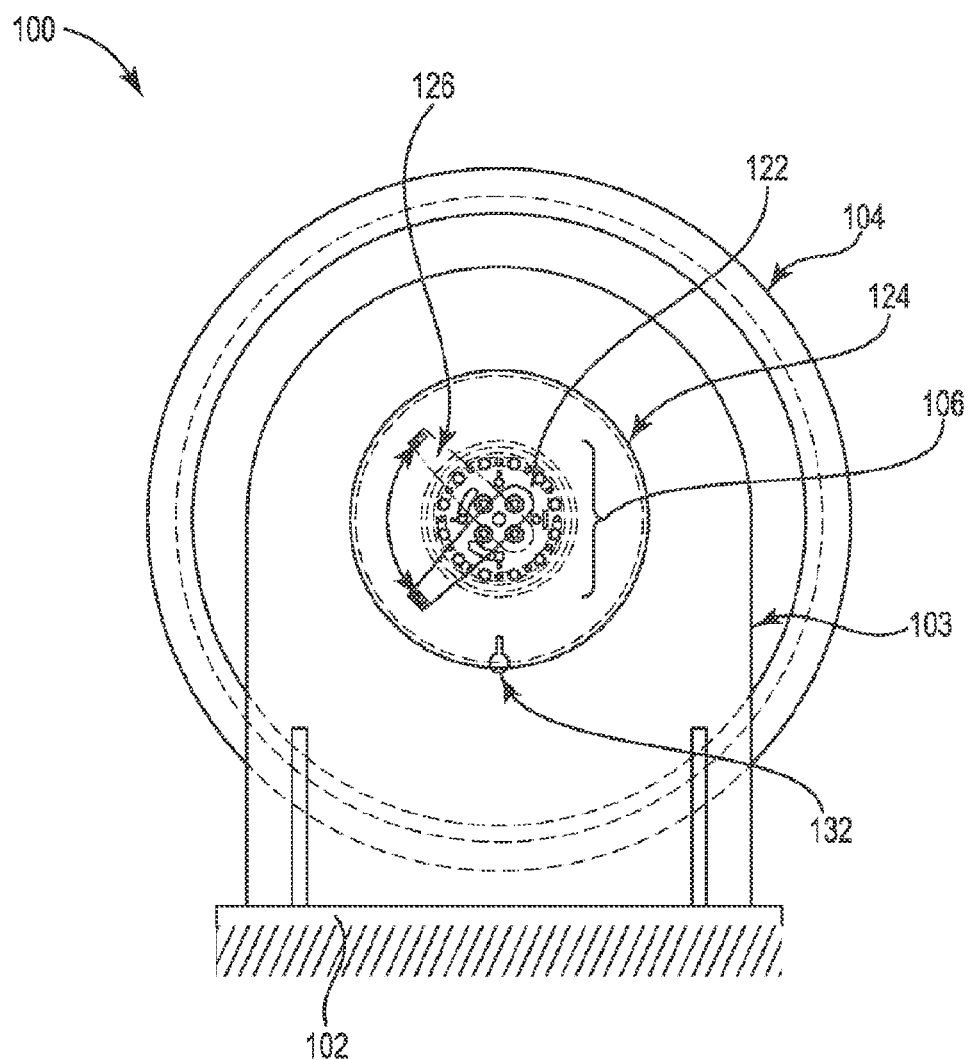
FIG. 1 is a side view of a sheave assembly of the present disclosure, according to one or more embodiments.
Figure 2:
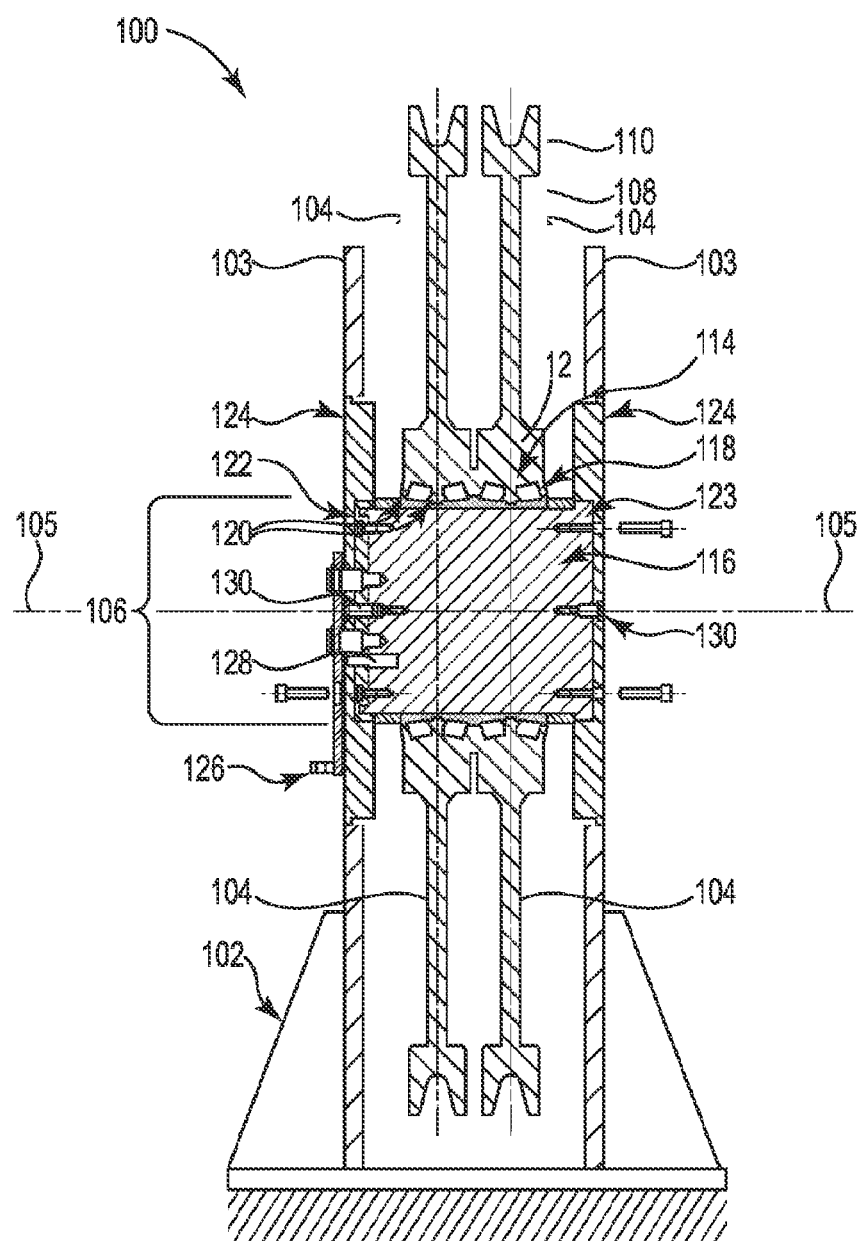
FIG. 2 is a cross sectional view of the sheave assembly of FIG. 1, according to one or more embodiments.

Turning now to FIGS. 1 and 2, a sheave assembly 100 of the present disclosure is shown. In some embodiments, the sheave assembly 100 may be configured to direct or guide a cable or line as part of a handling system, such as an oil derrick handling system. The sheave assembly 100 may, in some embodiments, be adapted to increase lifting or pulling capacity in a handling system by providing multiple sheaves for reeving the line. In some embodiments, the sheave assembly 100 may be arranged as part of a crown block, traveling block, or other sheave block on an oil derrick or other handling assembly, for example. In other embodiments, the sheave assembly 100 may be configured to direct or guide a cable or line as part of a tensioning system, such as a marine riser tensioning system. The sheave assembly 100 may, in some embodiments, be adapted to increase tension in a line by providing multiple sheaves for reeving the line. The sheave assembly 100 may be coupled to a support structure 102. The sheave assembly 100 may generally have one or more sheaves 104 arranged about a sheave shaft and cone sub-assembly 106 and the sheaves 104 may be configured to rotate about a central axis 105.

The support structure 102 may be a mobile or stationary support structure, and may be configured to arrange the sheave assembly 100 in a suitable location or position with respect to a handling system, such as an oil derrick handling system. For example, where the sheave assembly 100 is arranged as, or as part of, a crown block of a lifting assembly, the support structure 102 may be a relatively fixed support structure arranged on a derrick or other lifting assembly. As another example, where the sheave assembly 100 is arranged as, or as part of, a traveling block of a lifting assembly, the support structure 102 may be a mobile support structure, configured to move toward and away from the crown block. In this way, the support structure 102 may be arranged in generally any suitable location with respect to the sheave assembly 100. In some embodiments, the support structure 102 may have a support plate 103 arranged on either side of the sheave assembly 100. The two support plates 103 may be configured to provide a coupling location for the sheave assembly 100, so as to provide support for the sheave assembly while allowing the sheave(s) 104 to rotate freely. For example, the support plates 103 may couple, directly or indirectly, to the bearing assembly 106.

The one or more sheaves 104 may be arranged between the support plates 103 of the support structure 102, and may be configured to control and/or guide the position of a cable or line. Each sheave 104 may be arranged with its center of rotation corresponding with the central axis 105. Each sheave 104 may have a web portion 108 extending between a cable engaging portion or rim 110 and a bearing engaging portion 112. Each sheave 104 may be adapted to guide a cable, line, or the like as it passes through the sheave assembly 100. The sheave(s) 104 may be particularly adapted to maintain the cable or line in a substantially constant tension condition as it passes through the sheave assembly 100 and may be adapted to reduce or minimize kinking or abrupt bends in the cable or line.

Each sheave 104 may have any suitable inner and outer diameters, which may depend on such factors as cable or line size, load capacity, block size, or other factors. For example, each sheave 104 may have an outer diameter ranging from approximately 20 inches to approximately 114 inches, or from approximately 40 inches to approximately 100 inches, or from approximately 60 inches to approximately 80 inches. In other embodiments, other diameters may be provided. The rim 110 of each sheave 104 may be arranged along an outer diameter of the sheave and may be configured to receive a cable or line. For example, as shown in FIG. 2, each rim 110 may have a semi-circular or concave profile adapted for receiving a cable or line.

The bearing engaging portion 112 of each sheave 104 may be configured to engage with the bearing assembly 106, such that the sheave(s) may rotate about the central axis 105. The bearing engaging portion 112 of each sheave 104 may be arranged along an inner diameter of the sheave. The bearing engaging portion 112 of each sheave 104 may include a thickened inner collar of the sheave. In some embodiments, an innermost surface of the bearing portion 112 may be adapted to interface with a plurality of bearing rollers so as to facilitate rotation of the sheave 104. That is, in some embodiments, the innermost surface of the bearing portion 112 may include a bearing cup 114. The bearing cup may be keyed to the inner surface of the bearing or it may be formed into the inner surface. The bearing cup 114 may have a curved profile, with a convex shape in some embodiments. In other embodiments, the bearing cup 114 may have a flattened profile or other suitable profile shape adapted to interface with bearing rollers. The bearing cup 114 may generally provide a relatively smooth surface against which bearing rollers may roll.

The shaft and cone sub-assembly 106 may be configured to facilitate rotation of the sheave(s) 104 around the central axis 105. The sub-assembly 106 may generally include a sheave shaft 116, one or more bearing cones 118, one or more inner endcaps 122, and a spanner 126. The shaft and cone sub-assembly 106 may be configured to remain relatively stationary during hoisting or tensioning operations, while the sheave(s) 104 rotate about the central axis 105. Additionally, in some embodiments, the shaft and cone sub-assembly 106, or a portion thereof, may be configured to rotate or be repositioned about the central axis 105 so as to reposition the sub-assembly with respect to the load applied to the sheave assembly 100.

The sheave shaft 116 may provide an axis about which the one or more sheaves 104 may rotate. The sheave shaft 116 may be arranged along the central axis 105, and may generally extend between the two support plates 103. The sheave shaft 116 may have a hollow or solid core. The shaft 116 may have a rounded shape and may have any suitable cross sectional diameter, configured to be arranged within the inner diameter of the sheave(s) 104. The sheave shaft 116 may be configured to remain relatively stationary during hoisting or tensioning operations, as the sheave(s) rotate about the shaft. In some embodiments, the sheave shaft 116 may additionally be configured to be repositioned by rotating about the central axis 105 during a repositioning operation.

In some embodiments, one or more bearing cones 118 may be arranged about the shaft 116. Each bearing cone 118 may be a circular ring arranged around an outer surface of the shaft 116. Each bearing cone 118 may generally be configured to interface with one or more bearing rollers 120. In some embodiments, the bearing cones 118 may be configured to operate in pairs, such that a pair of bearing cones may be configured to interface with one or more bearing rollers 120. In some embodiments, each bearing cone 118, or a pair of bearing cones, may correspond with a sheave 104 having a bearing cup 114, wherein one or more bearing rollers 120 may be arranged between the cone, or pair of cones, and the corresponding cup. In this way, the sheave shaft 116 may have a number of bearing cones 118, or pairs of bearing cones, corresponding with the number of sheaves 104. In some embodiments, each bearing cone 118 may have a rounded or concave shape, which in some embodiments, may correspond with the convex shape of its corresponding bearing cup 114. In other embodiments, a pair of bearing cones 118 may together form a rounded or concave shape corresponding with the convex shape of a bearing cup 114. In other embodiments, the bearing cone(s) 118 may have a flattened or other suitable shape configured to interface with one or more bearing rollers 120. The bearing cones 118 may generally provide a relatively smooth surface on which the rollers 120 may roll. In some embodiments, the bearing cones 118 may be constructed of a material having a relatively high density or hardness, or providing a general resistance to wear.

In some embodiments, one or more bearing rollers 120 may be arranged between the cup(s) 114 of the sheave(s) 104 and the cone(s) 118 of the shaft and cone sub-assembly 106. The bearing rollers 120 may generally be configured to facilitate rotation of the one or more sheaves 104 around the shaft 116, and may provide for a reduced friction therebetween. In some embodiments, the bearing rollers 120 may be coupled to the shaft and cone sub-assembly 106 and may be configured to rotate or be repositioned about the central axis 105 with the sub-assembly. In other embodiments, the bearing rollers 120 may be coupled to the cup(s) 114 of the sheave(s) 104. In still other embodiments, the one or more bearing rollers 120 may be configured to float between the cup(s) 114 and cone(s) 118. In some embodiments, a plurality of bearing rollers 120 may be arranged between each bearing cup 114 and bearing cone 118 or pair of bearing cones (that is, between each sheave 104 and the shaft 116). The rollers 120 may be evenly spaced. For example, in some embodiments, the bearing rollers 120 may be arranged in a cage or other structure configured to maintain their spacing while allowing the rollers to roll or rotate. As the sheave 104 rotates about the shaft 116 to guide a cable or line, the bearing rollers 120 may each roll or rotate to facilitate rotation of the sheave. The bearing rollers 120 may have a spherical or cylindrical shape in some embodiments, and may be constructed of any suitable material(s). The bearing rollers 120 may generally be, or may be similar to, known bearing rollers in the industry.

In some embodiments, the shaft and cone sub-assembly 106 may include one or more inner endcaps 122. An inner endcap 122 may be arranged on at least one end of the sheave shaft 116. The inner endcap(s) 122 may be configured to maintain the bearing cones 118 in a fixed position with respect to one another and/or with respect to the shaft 116, such as during hoisting operations or tensioning operations. In some embodiments, the inner endcap 122 may additionally be configured to maintain the bearing cones 118 in a fixed position with respect to one another and/or with respect to the shaft 116 during a repositioning operation, where the shaft and cones may be rotated about the central axis 105. The inner endcap 122 may have a rounded shape in some embodiments, having a diameter similar to that of a cross section of the sheave shaft 116. In other embodiments, the inner endcap 122 may have any other suitable shape and/or size. The inner endcap 122 may be secured to the shaft 116 by one or more screws, bolts, or other suitable attachment mechanisms. In some embodiments, two inner endcaps 122, one at each end of the shaft 116, may be configured to clamp the bearing cones 118 in a relatively fixed position with respect to the shaft. In other embodiments, one or both ends of the shaft 116 may have a shoulder or ridge 123 operating as a clamp to maintain the bearing cones 118 in a fixed position along the shaft.

Figure 3A:
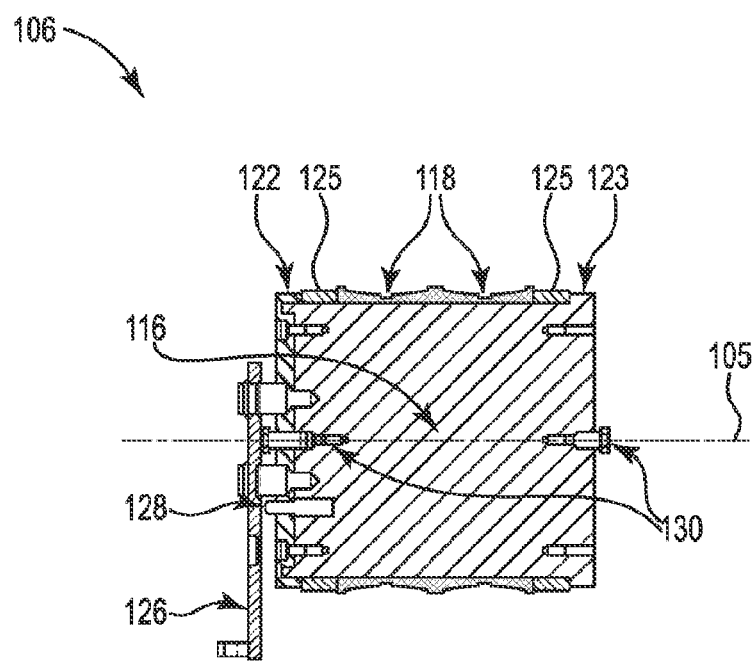
FIG. 3A is a cross sectional view of the shaft and cone sub-assembly of FIG. 1, according to one or more embodiments.

For example, as shown in FIGS. 2 and 3A, where the inner endcap 122 may be arranged at one end of the sheave shaft 116, an opposing end of the sheave shaft may have a shoulder 123. In some embodiments, the shoulder 123 may be an extended portion of the shaft 116, the extended portion having a diameter or width larger than that of the shaft. Together the shoulder 123 and inner endcap 122 may operate to clamp the bearing cones 118 into place with respect to one another and with respect to the shaft 116.

Figure 3B:
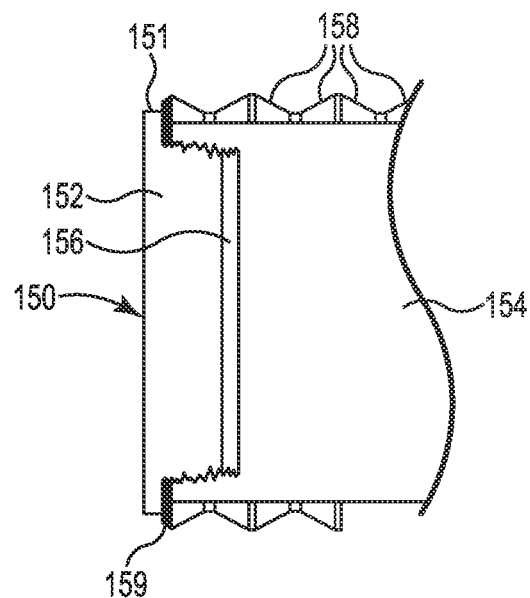
FIG. 3B is a cross sectional view of a portion of another shaft and cone sub-assembly of the present disclosure, according to one or more embodiments.
Figure 3C:
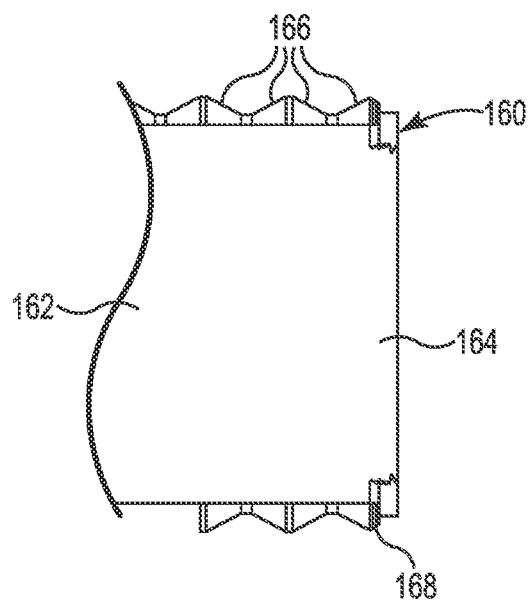
FIG. 3C is a cross sectional view of a portion of another shaft and cone sub-assembly of the present disclosure, according to one or more embodiments.
Figure 4:
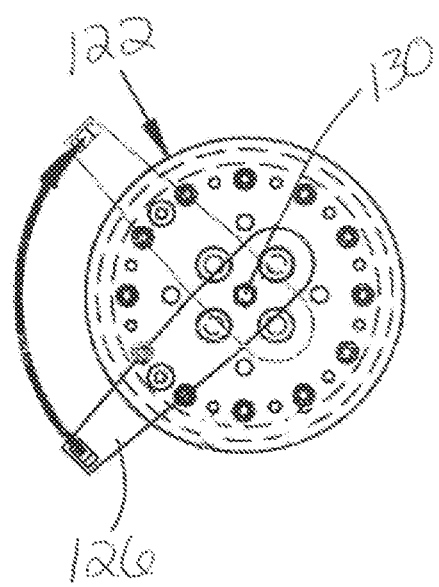
FIG. 4 is a side view of the inner endcap and spanner of FIG. 1, according to one or more embodiments.

FIGS. 3B and 3C show additional embodiments of inner endcaps. As shown for example in FIG. 3B, an inner endcap 150 may have a cap portion 151 configured to maintain a position of a plurality of bearing cones 158, and an extension portion 152 configured to extend into a receiving portion 156 of the shaft 154. The receiving portion 156 may be or include an opening or cutout in the shaft 154 configured to receive the extension portion 152. In some embodiments, the extension portion 152 may have threading corresponding to threading arranged within the receiving portion 156 of the shaft 154, such that the inner endcap 150 may couple to the shaft 154. In other embodiments, the extension portion 152 may be configured to slip fit into the receiving portion 156. In other embodiments, the inner endcap 152 may couple to the shaft 154 by other suitable mechanisms. In some embodiments, one or more spacers 159 may be arranged between the cap portion 151 of the inner endcap 150 and the shaft 154 and/or cones 158. The inner endcap 152 may be configured to maintain a plurality of bearing cones 158 in a relatively fixed position with respect to one another and with respect to the shaft 154.

As shown in FIG. 3C, in some embodiments, instead of, or in addition to, an inner endcap, an inner endcap nut 160 may be arranged around an end of the shaft 162. The nut 160 may be a threaded nut configured to be arranged over an end of the shaft 162 to maintain a plurality of bearing cones 166 in a relatively fixed position with respect to one another and with respect to the shaft 162. The nut 160 may generally have an inner diameter or width the same as or slightly larger than that of the shaft 162, such that the nut may be arranged around the shaft. In some embodiments, the shaft 162 may have a nut receiving portion 164 having a diameter or width smaller than the diameter or width of other portions of the shaft. In some embodiments, the nut 160 may have threading arranged on an inner surface. Similarly, the shaft 162 may have threading arranged on an outer surface, such as on an outer surface of the nut receiving portion 164, configured to receive the nut 160. In other embodiments, the nut 160 may be configured to slip fit onto the shaft 162 or may couple to the shaft via any other suitable coupling mechanism. In some embodiments, one or more spacers 168 may be arranged between the inner endcap nut 160 and the shaft 162 and/or bearing cones 166.

In some embodiments, one or more spacers 125, such as round ring spacers, may be arranged between the inner endcap 122 and cones 118, and/or between the shoulder 123 and cones. In some embodiments, one or more spacers 125 may additionally or alternatively be arranged between each cone 118. The spacers may be comprised of any suitable material, including any suitable plastic or rubber material, one or more metals, or any other suitable material(s).

In some embodiments, the shaft and cone sub-assembly 106, including the shaft 116, cone(s) 118, inner endcap(s) 122, spacer(s) 125 and/or other components, may be configured to rotate about the central axis 105. In some embodiments, a spanner 126 may be used to rotate the shaft and cone sub-assembly 106. As shown in each of FIGS. 1-3, in some embodiments, an inner endcap 122 may be coupled to, or be configured to couple to, the spanner 126. The spanner 126 may be configured to rotate the shaft and cone sub-assembly 106 in order to rotationally reposition the sub-assembly about the central axis 105. The spanner 126 may couple to the shaft and cone sub-assembly 106 via one or more bolts, screws, or other suitable attachment mechanisms. The spanner 126 may provide a lever extending from the shaft and cone sub-assembly 106, which may be pulled or pushed to cause the sub-assembly to rotate about its axis. The spanner 126 may generally extend outward beyond a support plate 103, as shown for example in FIGS. 1 and 2, so as to be generally readily accessible. In some embodiments, a spanner 126 and inner endcap 122 may be provided at each end of the shaft 116, such that the shaft may be rotated from either end. In other embodiments, the shaft 116 may have an inner endcap 122 at each end, but a spanner 126 on only one end. In still further embodiments, the shaft 116 may have an inner endcap 122 and spanner 126 at one end, and a shoulder 123 at an opposing end. In still other embodiments, other configurations may be provided.

In some embodiments, one or more mechanisms may be used to restrict and/or direct rotation of the shaft and cone sub-assembly 106. For example, as shown in FIG. 3, one or more plungers 128, such as one or more ratcheting plungers, may be used to restrict and/or direct rotation of the sub-assembly 106. In some embodiments, the plunger(s) 128 may extend from the sub-assembly 106, such as from an inner endcap 122, and may be configured to engage with a component that remains relatively stationary during rotation of the sub-assembly, such as an outer endcap 124. Particularly, the plunger 128 may be configured to align with and extend into one or more openings or grooves of the outer endcap 124. The one or more openings or grooves may correspond with desired degrees of rotation or positions of the sub-assembly 106. The plunger 128 may be pushed inward to allow the shaft and cone sub-assembly 106 to rotate, and once a desired position or degree of rotation is achieved, the plunger may align with and extend into an opening or groove. The plunger 128 may be pushed inward automatically when the spanner 126 is pushed or pulled, in some embodiments. In some embodiments, the plunger 128 may provide a ratcheting mechanism may providing a curved or angled plunger head having a high edge facing one possible direction of rotation and a low edge facing another possible direction of rotation. In such embodiments, as the spanner 126 is pushed or pulled, the low edge may allow the plunger 128 to be pushed down such that the spanner may rotate in one direction, but the high edge may prevent the plunger from being pushed down and thus generally prevent rotation in a "wrong" or undesired direction. In some embodiments, one or more plunger(s) 128 may align with four openings or grooves, and thus provide four rotational positions at which the shaft and cone sub-assembly 106 may be arranged. In other embodiments, the plunger(s) 128 may provide any other suitable number of rotational positions for the sub-assembly 106. In some embodiments, the plunger(s) 128 may serve as an indicator of the current position of the shaft and cone sub-assembly 106. In some embodiments, one or more bushings may be used to facilitate rotation of the sub-assembly 106.

Turning back to FIGS. 1 and 2, an outer endcap 124 may be arranged on or over one or more ends of the shaft and cone sub-assembly 106. The one or more outer endcaps 124 may be configured to maintain the shaft and cone sub-assembly 106 in a relatively fixed position axially and/or with respect to the support plate(s) 103 or another portion of the support structure 102. In some embodiments, the one or more outer endcaps 124 may be configured to allow controlled or desired rotation of the shaft and cone sub-assembly 106, such as where desired with respect to a tensioning system, for example. Each outer endcap 124 may be arranged over an inner endcap 122 or over a shoulder 123. The outer endcap(s) 124 may additionally extend radially outward from the shaft 116 and may overlay a portion of the support plate(s) 103, as shown in FIGS. 1 and 2. The outer endcap(s) 124 may each have a rounded shape in some embodiments, having a diameter larger than that of a cross section of the shaft 116, in some embodiments. In other embodiments, the outer endcap(s) 124 may have any other suitable shape and/or size. The outer endcap(s) 124 may be secured to the shaft 116 and/or inner endcap 122 and/or shoulder 123 by one or more screws, bolts, or other suitable attachment mechanisms. An outer endcap 124 may additionally be secured to the support structure 102, such as to a support plate 103 via one or more bolts, screws, or other suitable attachment mechanisms. In some embodiments, one or more outer endcaps 124 may have a central opening such that the spanner 126 may extend through the outer endcap. In some embodiments, one or more outer endcaps 124 may have one or more grooves and/or openings for receiving one or more plungers 128. As described above, the grooves and/or openings may be arranged to provide any suitable number of predetermined rotational positions of the shaft and cone sub-assembly 106, such as four predetermined rotational positions. In some embodiments, one or more outer endcaps 124 may additionally or alternatively be configured to rotate the shaft and cone sub-assembly 106. For example, an outer endcap 124 may be configured to rotate with the shaft and cone sub-assembly.

In some embodiments, in addition to or alternative to one or more bolts, screws, or other attachment mechanisms, a center stud 130 may be arranged through each outer endcap 124, and extend at least partially into an adjacent inner endcap 122, shoulder 123, and/or the shaft 116. Each center stud 130 may be configured to maintain an outer endcap 124 in place with respect to the central axis 105. In some embodiments, the one or more center studs 130 may operate to generally hold the outer endcap 124 in position when the bolts, screws, or other attachment mechanisms otherwise holding the outer endcap(s) in place are removed, such as during a repositioning operation wherein the shaft and cone sub-assembly is rotated about the central axis 105. The center stud(s) 130 may generally be permitted to rotate independent of the outer endcap(s) 124, such that the shaft and cone sub-assembly 106 may rotate without causing rotation of the outer endcap(s).

In some embodiments, each outer endcap 124 may have a locator or key 132, as shown in FIG. 1. In some embodiments, the locator or key 132 may be a bolt, screw, or other suitable mechanism configured to couple to, or otherwise provide for engagement with, a support plate 103 or other support structure 102 component. In other embodiments, the locator or key 132 may be a visual indicator, configured to visually indicate alignment between the outer endcap 124 and support plate 103 or other support structure 102 component. The locator or key 132 may help to maintain a position of the outer endcap 124 with respect to the support plate 103 or other support structure 102 component.

Figure 5:
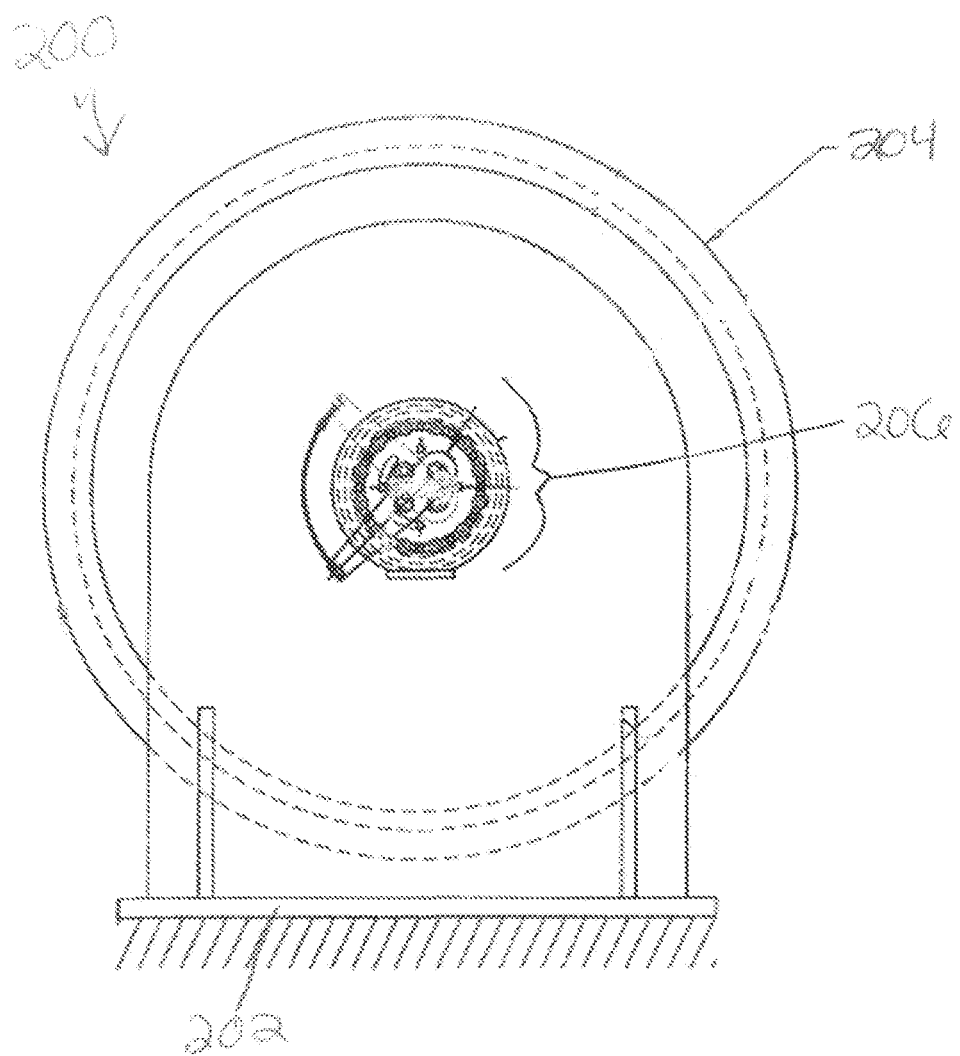
FIG. 5 is a side view of a sheave assembly of the present disclosure, according to one or more embodiments.
Figure 6:
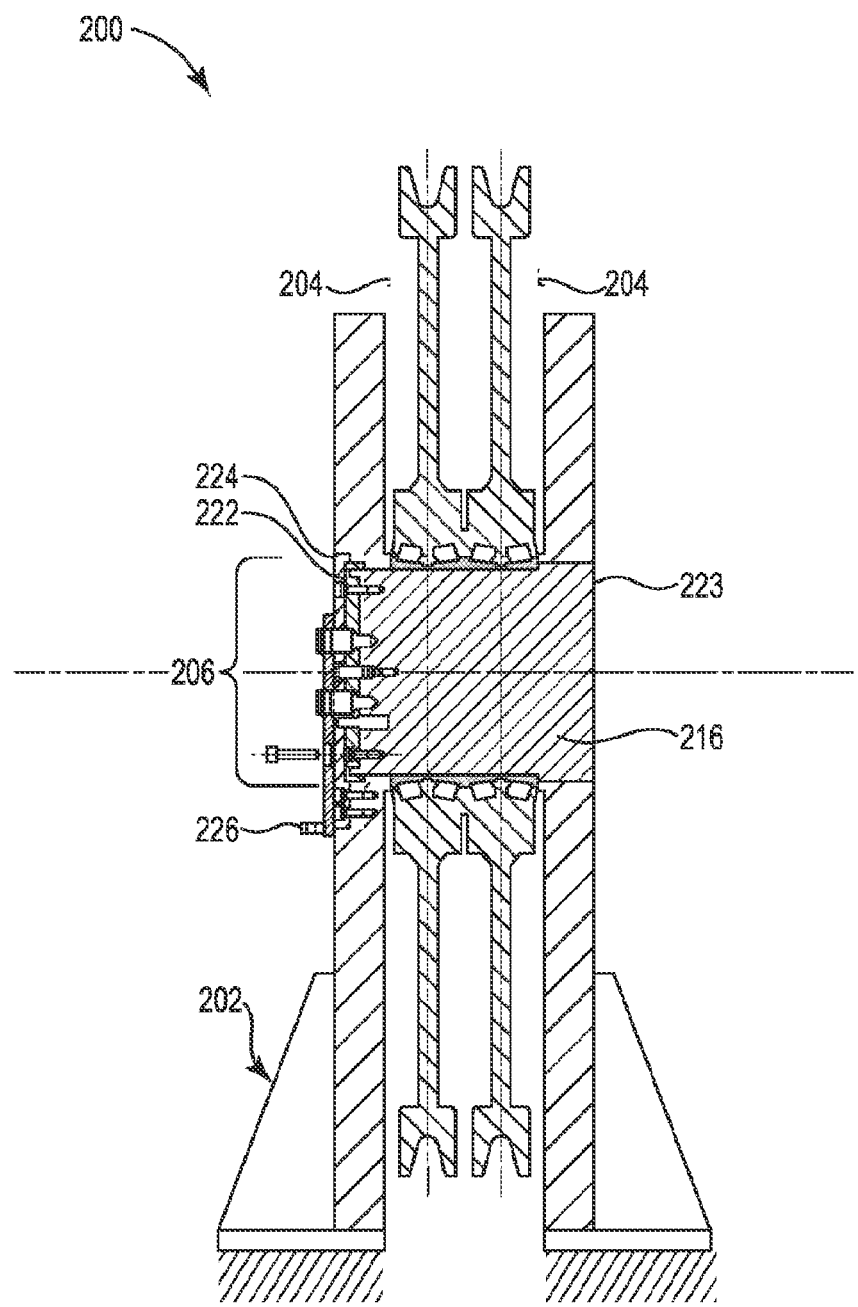
FIG. 6 is a cross sectional view of the sheave assembly of FIG. 4, according to one or more embodiments.

Turning now to FIGS. 5 and 6, another sheave assembly 200 of the present disclosure is shown. The sheave assembly 200 may be arranged on or within a support structure, and may generally have one or more sheaves arranged around a shaft and cone sub-assembly, and one or more bearing rollers arranged between each sheave and each bearing cone of the shaft and cone sub-assembly. The sheave assembly 200 may generally have components similar to those described above with respect to FIGS. 1 and 2, including one or more sheaves 204, a sheave shaft and cone sub-assembly 206, a support structure 202, and other components described above. However, in some embodiments, the sheave assembly 200 may have an inner endcap and outer endcap on only one end of the shaft and cone sub-assembly. For example, as shown in FIG. 6, the shaft and cone sub-assembly 206 may have an inner endcap 222 and spanner 226, which may be similar to those described above. An outer endcap 224, similar to those described above, may be arranged over the inner endcap 222 and may be configured to engage with a plunger. However, an opposing end of the shaft and cone sub-assembly 206 may have a shoulder 223 or ridge, which as described above, may be an extended portion of the shaft 216 having a diameter or width larger than that of the shaft in order to clamp the bearing cones into place with respect to one another and with respect to the shaft. In some embodiments, as shown in FIG. 6 for example, the shoulder 223 may be provided without an outer endcap, such that the shoulder 223 end of the shaft and cone sub-assembly 206 may be permitted to rotate freely.

Figure 7:
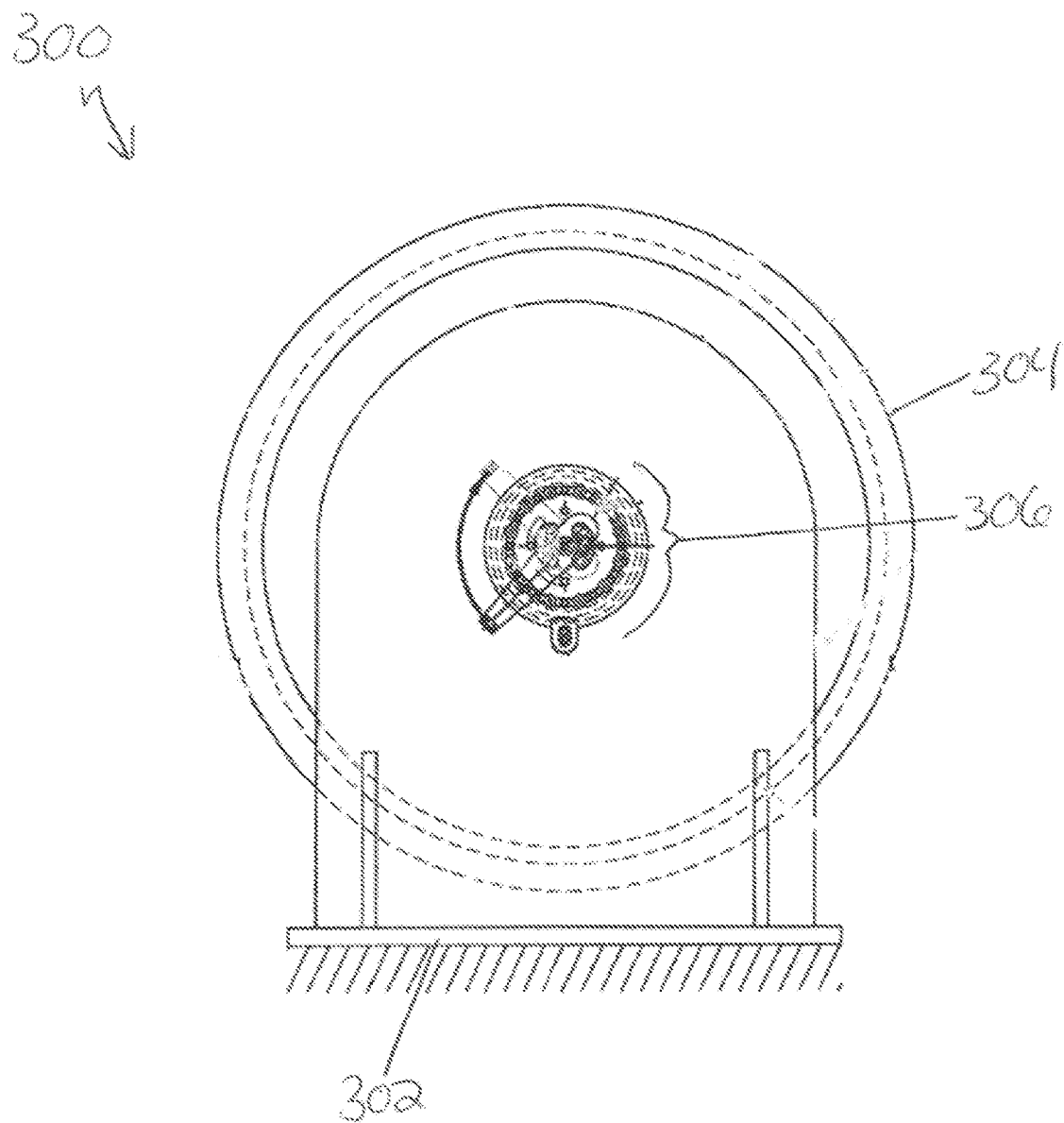
FIG. 7 is a side view of a sheave assembly of the present disclosure, according to one or more embodiments.
Figure 8:
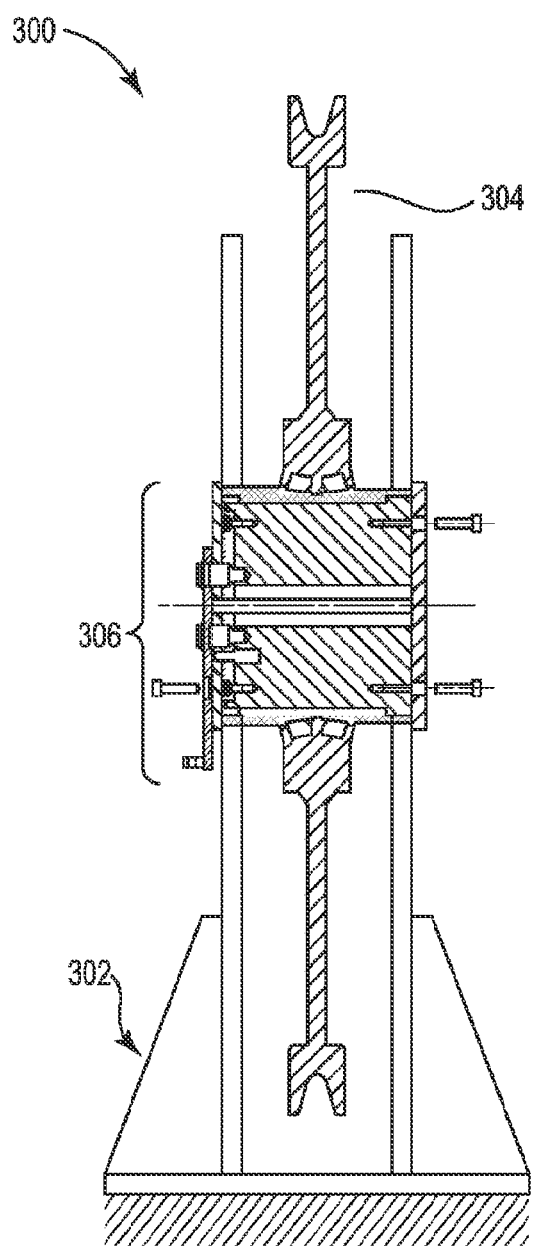
FIG. 8 is a cross sectional view of the sheave assembly of FIG. 7, according to one or more embodiments.

Turning now to FIGS. 7 and 8, another sheave assembly 300 of the present disclosure is shown. The sheave assembly 300 may be arranged on or around a support structure 302, and may generally have one or more sheaves 304 arranged around a shaft and cone sub-assembly 306, with one or more bearing rollers arranged between each sheave and each bearing cone of the shaft and cone sub-assembly. The sheave assembly 300 may generally have components similar to those described above with respect to FIGS. 1 and 2. However, in some embodiments, the sheave shaft may have a hollow or partially hollow core, and a center stud extending through the full longitudinal length of the shaft.

Figure 12:
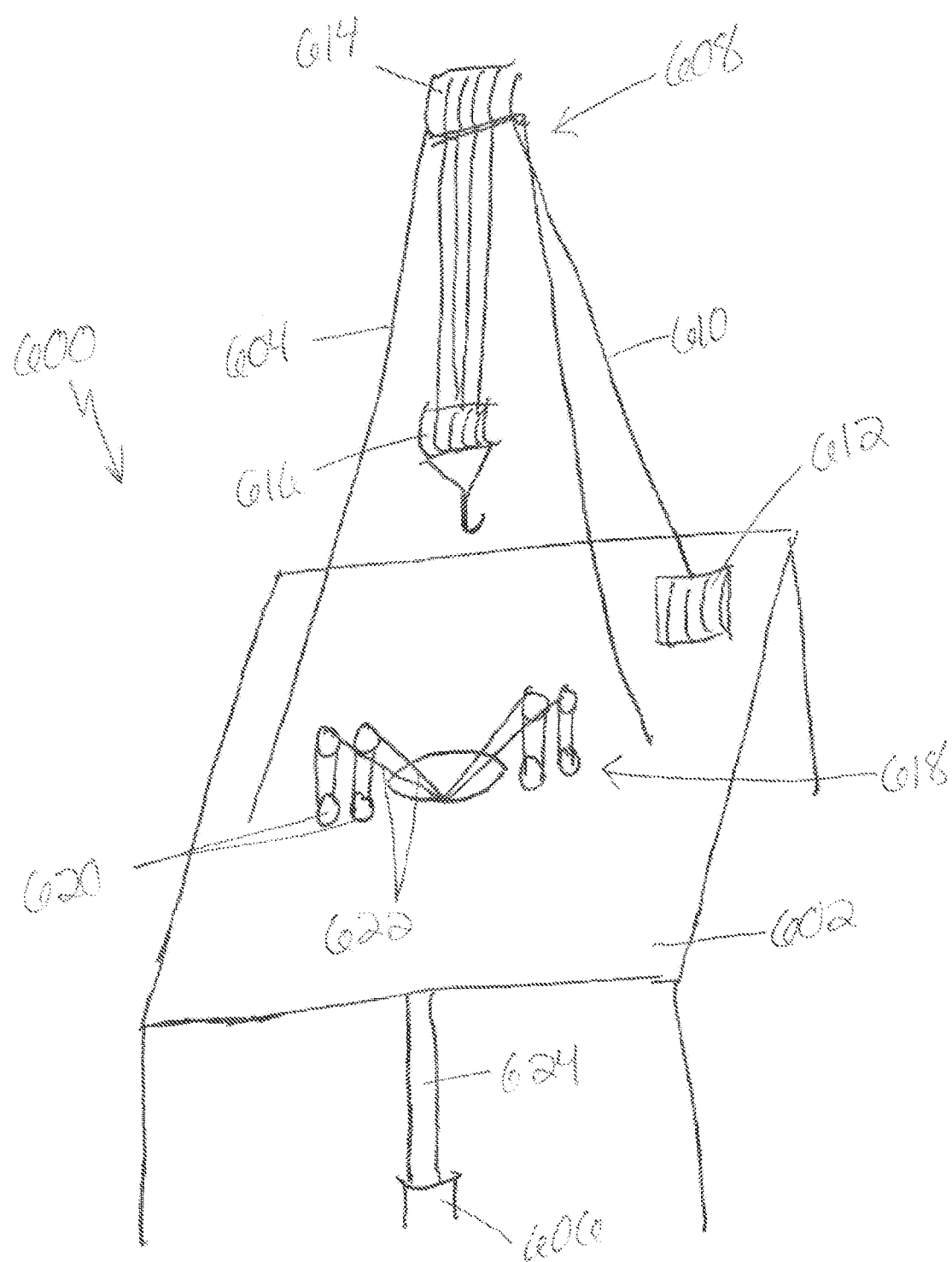
FIG. 12 is a perspective view of a drilling rig having a tensioning system and a handling system of the present disclosure, according to one or more embodiments.

In some embodiments, a sheave assembly of the present disclosure may be arranged as part of a handling system or a tensioning system for a drill rig, such as an oil drilling or well servicing rig. For example, FIG. 12 shows a drill rig 600, according to one or more embodiments. The drill rig 600 may be a mobile or stationary rig. For example, in some embodiments, the drill rig 600 may be arranged on rails, tires, or walking feet, and may thus be configured to move among wells, such as on a pad drilling site, and/or between drilling sites. In other embodiments, a drill rig 600 may be a relatively stationary rig on land or sea. In still other embodiments, a drill rig 600 may be a drillship. The drill rig 600 may generally have a drill floor 602 and a derrick or mast 604. The drill rig 600 may be configured to be arranged over a wellhead 606.

In some embodiments, the drill rig 600 may have a lifting, hoisting, or other handling system 608. The handling system 608 may include a line 610 extending from a drawworks 612. The line 610 may be reeved between a crown block 614 and a traveling block 616 in some embodiments. In some embodiments, a sheave assembly of the present disclosure may be arranged as, or as part of, the crown block 614, traveling block 616, or other sheave block of drill rig handling system 608.

Additionally, in some embodiments, the drill rig 600 may have a tensioning system 618. The tensioning system may have one or more tensioners 620, such as but not limited to hydraulic tensioners, having one or more sheave blocks. The tensioners 620 may be configured to maintain a desired amount of tension in one or more tensioning lines 622 coupled to a drilling riser 624 that extends between the drill floor 602 and the wellhead 606. In some embodiments, a sheave assembly of the present disclosure may be arranged as, or as part of a sheave block on a tensioner 620 or other sheave block of a drill rig tensioning system 618.

Figure 9:
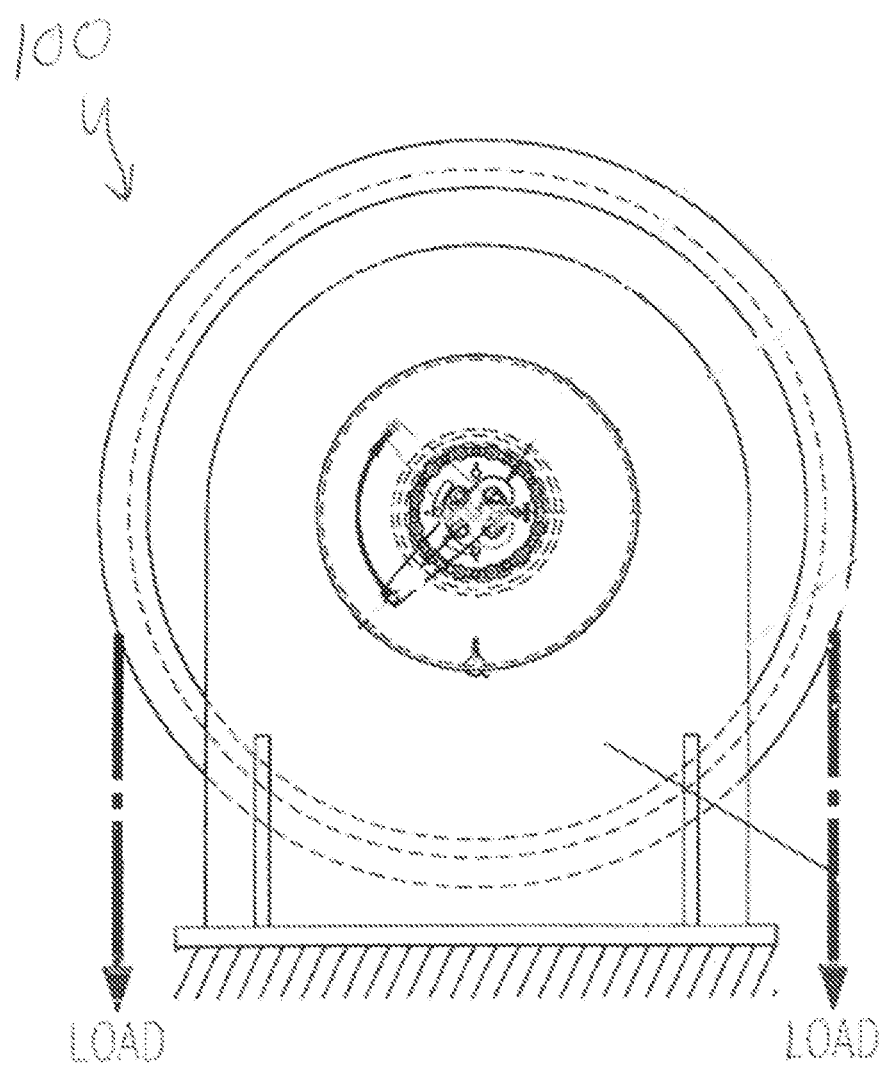
FIG. 9 is a side view of the sheave assembly of FIG. 1 with applied loading, according to one or more embodiments.

In use, a sheave assembly of the present disclosure may guide a cable or line during hoisting or tensioning operations, and additionally, may provide for repositioning of bearing cones, without removing the sheaves or withdrawing the cable or line, in order to extend the life of the cones. That is, as hoisting or tensioning operations cause localized wear on bearing cones due to loading on the sheaves, the bearing cones, together with the sheave shaft, may be rotated about the shaft's central axis, independent of the sheaves and without removing the sheaves, in order to reposition the cones such that a different portion of the cones receives the loading from the sheaves. As a particular example, a sheave assembly of the present disclosure may be arranged as, or as part of, a crown block on an oil derrick or other handling system. Loading from hoisting operations may be directed downward, and thus may cause increased wear at an uppermost or lowermost portion of the cones, as compared with other portions of the cones. For example, FIG. 9 shows the sheave assembly 100 with applied loading from a cable or line. With use over time, the applied load may cause the bearing cones and/or bearing rollers on the uppermost portion of the sheave assembly to wear down. After a predetermined period of time or amount of use, or after an amount of wear is detected on the bearing cones, the sheave shaft and cones may be rotated, independent of the sheaves, such that a different portion of the bearing cones is arranged as the uppermost portion to receive the loading, and such that the portion of the cones which was previously worn is no longer receiving the applied load or is receiving a reduced load.

To avoid failure, a shaft and cone sub-assembly of the present disclosure may be repositioned or rotated with respect to the one or more sheaves based on the amount of wear on the one or more cones. The amount of wear on the cones may be determined in various ways. For example, in some embodiments, the shaft and cone sub-assembly may be repositioned after a predetermined period of time has passed, such as a fraction of the expected useful life of the cones, for example. In other embodiments, the shaft and cone sub-assembly may be repositioned after a predetermined number of hoisting or tensioning operations or estimated number of sheave rotations, for example. In still other embodiments, the shaft and cone sub-assembly may be repositioned after an amount of wear is indicated on the one or more cones. For example, the wear on the cones may be determined visually. If, upon inspection, it is determined that a surface of the one or more cones is worn to a particular fraction or percentage where the load is applied from the sheave(s), the sub-assembly may be repositioned. Alternatively, one or more indicators may be coupled to the sub-assembly to provide a visual, audible, or other alert when the surface of the one or more cones has experienced a particular amount of wear. For example, one or more vibration monitoring devices may provide an indication of wear on the cones.

In some embodiments, a shaft and cone sub-assembly may be rotated to a particular degree. Controlling the amount of rotation may help to ensure that worn surfaces of the cone(s) are not reused. As described above, a ratcheting plunger or other mechanism(s) may be used to control the degree of rotation of the sub-assembly, as well as the direction of rotation, so as to help keep track of which positions or surfaces have been used. In some embodiments, the shaft and cone sub-assembly may be rotated approximately 90 degrees for each repositioning operation. Such 90 degree rotations may thus provide a total of four loading positions. Thus, in such embodiments, the shaft and cone sub-assembly may be replaced or repaired after the four positions have been used. In other embodiments, other degrees of rotation may be used. For example, the shaft and cone sub-assembly may be rotated approximately 45 degrees for each repositioning, such that the sub-assembly may have a total of eight loading positions. In other embodiments, the shaft and cone sub-assembly may be rotated approximately 120 degrees for each repositioning, such that the sub-assembly may have a total of three loading positions. Still other degrees of rotation may be provided in other embodiments, such that the sub-assembly may have any suitable number of loading positions. In some embodiments, the number of loading positions and degree of rotation between positions may be based on the size of the sub-assembly, sheaves, bearing rollers, and/or other components. In other embodiments, the number of loading positions and degree of rotation between positions may be based on the size or nature of the load applied to the cones in the hoisting or tensioning operations. In still other embodiments, the number of loading positions and degree of rotation between positions may depend on other factors.

In some embodiments, the last loading position may be reserved in case of cone failure or distress. For example, where a shaft and cone sub-assembly provides four loading positions at 90 degree intervals, the fourth loading position may be reserved, such that the sub-assembly may be replaced or repaired after three positions have been used. In this way, a final position may be reserved during all hoisting or tensioning operations in case of sudden or unexpected failure. Where a ratcheting plunger or other mechanism(s) control degree of rotation and/or direction of rotation, the plunger may provide a stop after the third or second-to-last position, so as to prevent the last position from being used. The stop may be overridden if the last position is needed upon failure or distress.

Figure 10:
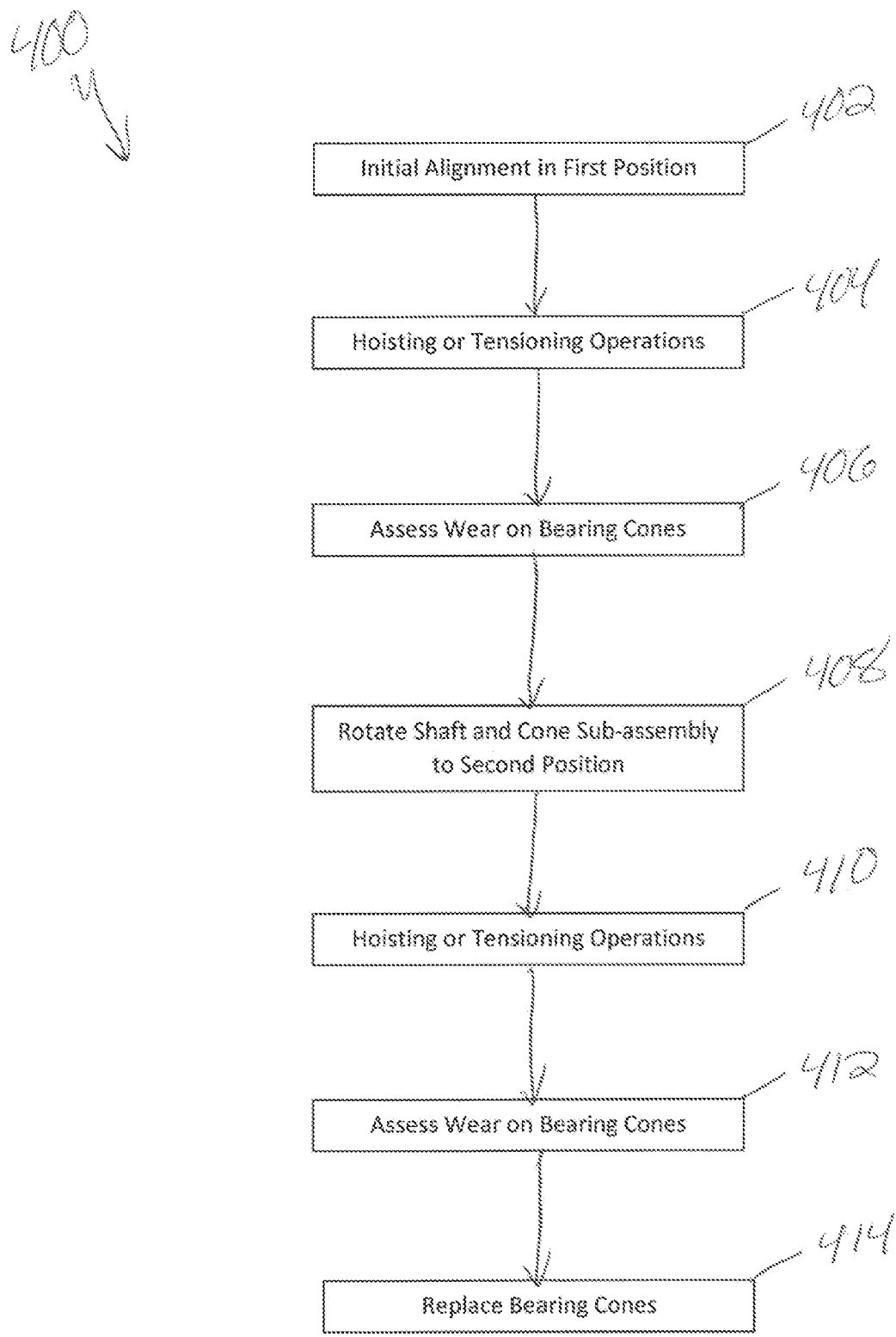
FIG. 10 is a method of using a sheave assembly of the present disclosure, according to one or more embodiments.

Turning now to FIG. 10, a method 400 of using a sheave assembly of the present disclosure is shown. As described above, a sheave assembly of the present disclosure may be used with a shaft and cone sub-assembly in a first operational or rotational position for a period of time or until an amount of wear is experienced by the bearing cone(s) due to loading on the sheave assembly from handling operations. The shaft and cone sub-assembly may then be rotated or repositioned to a second operational or rotational position. With the shaft and cone sub-assembly in the second position, loading from the handling operations may be applied to different location on the bearing cone(s). When a period of time or an amount of time has passed or an amount of wear is experienced by the bearing cone(s) in the second position, the shaft and cone sub-assembly may be rotated or repositioned to a third position in some embodiments. In other embodiments, depending on the number of operational or rotational positions of the sub-assembly, the sub-assembly or components thereof may be removed or replaced. Particularly, the method 400 may include initial alignment of the sheave and cone sub-assembly in a first operational or rotational position (402), hoisting or tensioning operations (404), assessing an amount of wear on the one or more bearing cones (406), rotating the shaft and cone sub-assembly to a second position (408), hoisting or tensioning operations (410), assessing an amount of wear on the bearing cones (412), and replacing the bearing cones (414).

Aligning the shaft and cone sub-assembly in a first operational or rotational position (402) may generally include assembling the shaft and cone sub-assembly, assembling the sheave assembly, and/or arranging the sheave assembly in an appropriate location with respect to a handling system. In some embodiments, the initial alignment step may include, for example, arranging one or more bearing cones, spacers, spanners, and/or inner endcaps on the sheave shaft. Additionally or alternatively, the alignment step may include arranging one or more sheaves on the sheave shaft. It may be appreciated that the bearing cones and/or sheaves may be arranged on the sheave shaft in a particularly desired order or configuration, so as to accommodate a "fast end" of a cable or line, for example. The alignment step may include arranging the sheave shaft and sheaves on or within a support structure, such as between two support plates. The alignment step may include, in some embodiments, coupling one or more outer endcaps to the sheave shaft. The alignment step may additionally or alternatively include arranging a cable or line around or across the one or more sheaves, thus connecting the sheave assembly to the handling system. After an initial alignment, hoisting or tensioning operations (404) or other system operations may generally proceed using the sheave assembly. That is, where the sheave assembly is part of a handling operation, hoisting operations may proceed, or where the sheave assembly is part of a tensioning system, tensioning operations may proceed.

Assessing an amount of wear on the bearing cones (406) may include determining if a predetermined period of time, or a fraction thereof, has passed; determining if a predetermined number of handling operations or sheave rotations has occurred; or determining if a predetermined amount of physical wear is present on the one or more bearing cones. For example, in some embodiments, the one or more bearing cones may have a known useful life, based on applied loading, material(s) of the cones, size of the cones, bearing rollers, or sheaves, and/or other factors. Passage of time with respect to the known useful life of the cones may indicate that an amount of wear has occurred. In other embodiments, the useful life of the cones may relate to a number of handling operations and/or rotations of the sheaves. In other embodiments, the assessment of wear may be based on an indication of wear on the one or more cones, such as a visual inspection, vibration monitoring, or another audio or visual indicator. For example, a visual inspection may indicate that a particular percentage of the cone surface at the point of loading has been worn down, or that pitting or other indicators of wear are present.

If the bearing cones have experienced wear approximately at or beyond a first threshold, the shaft and cone sub-assembly may be rotated or repositioned to a second operational or rotational position (408) so as to move the cone(s) with respect to the point of loading on the cone(s). When it is determined that the shaft and cone sub-assembly should be repositioned with respect to the loading on the sheave assembly, hoisting, tensioning, or other operations may be temporarily paused. In some embodiments, the repositioning operation may be performed during maintenance of the handling or tensioning system, movement of the handling or tensioning system, or any other pause in operations. In some embodiments, repositioning or rotating the shaft and cone sub-assembly may include de-coupling one or more outer endcaps from the shaft and cone sub-assembly, such as by loosening or removing one or more screws, bolts, or other coupling mechanisms from the outer endcap(s). The rotating or repositioning may additionally include rotating the shaft and cone sub-assembly about its central, longitudinal axis via the spanner. In other embodiments, the outer end cap may remain coupled to the shaft and cone sub-assembly and may be used to rotate the shaft and cone sub-assembly. The spanner or outer endcap may be may be turned manually, partially manually, or automatically using one or more mechanisms.

In some embodiments, as described above, a plunger mechanism or other mechanism(s) may be used to stop the rotation of the spanner or sub-assembly once it reaches a known or desired position. The plunger may be pushed in manually or automatically prior to pushing or pulling the spanner. As described above, the plunger may provide a ratcheting mechanism and thus may allow rotation in only one direction. This may help to ensure that the sub-assembly is consistently rotated in a same direction for each rotational operation, thus helping to prevent a same sub-assembly position from being used twice. However, where a failure occurs, or there is otherwise a need to rotate the sub-assembly in a "wrong" direction, the plunger may be mechanically overridden and pushed in to allow such rotation.

The sub-assembly may be rotated to a particular degree or angle in some embodiments to reach the second rotational or operational position. Thus, the plunger or other mechanism(s) may cause rotation to stop or pause once that degree or angle is achieved. In other embodiments, the sub-assembly may be rotated based on a visual indication that a degree or angle has been achieved, or may simply be rotated based on a visual indication that the area of the cone(s) that was previously subject to loading is moved away from the point of loading. Where a particular degree or angle of rotation separates the first position from the second position, the degree or angle may be based on a number of operational or rotational positions provided by the sub-assembly. For example, where the sub-assembly has four operational or rotational positions for loading, the sub-assembly may be rotated approximately 90 degrees to move from the first position to the second position. Where there are more or fewer operational or rotational positions, the sub-assembly may be rotated to a lower or higher degree or angle, respectively.

In some embodiments, the degree or angle of rotation may depend on the amount of wear detected on the bearing cone(s). For example, if the bearing cones are near failure or are more than half worn at the loading point, the shaft and cone sub-assembly may be rotated approximately 180 degrees, so as to arrange the weakened portion of the bearing cone(s) opposite the point of loading.

Once in the second rotational or operational position, one or more outer endcaps may be re-coupled to the shaft and cone sub-assembly, if they were de-coupled, and hoisting, tensioning, or other operations may continue (410) with the sheave assembly. With the sub-assembly in a new position, a different portion of the cone(s) may be subjected to loading from the hoisting or tensioning operations, such that a different area of the cone(s) may experience wear. The portion of the cone(s) previously subject to the loading in the first position may be rotated away from the loading in the second position, such that it receives reduced or no loading and experiences reduced wear.

In some embodiments, steps 406, 408, and 410 may be repeated for a suitable number of times so as to use each of the operational or rotational positions of the shaft and cone sub-assembly. For example, if the shaft and cone sub-assembly has a total of four rotational positions, with one position reserved in case of failure, steps 406, 408, and 410 may be repeated twice, until the shaft is in the third rotational position. After experiencing wear from hoisting or tensioning operations in the third rotational position, the sub-assembly, or components thereof, may be repaired or replaced, as described below.

Another assessment of wear may be made with the shaft and cone sub-assembly in the second position (412). As described above, the assessment of wear may be made based on an amount of time passing, a number of operations or rotations occurring, or an amount of physical wear occurring. The assessment of wear may be compared to a first and second threshold, or any suitable number of wear thresholds.

If the bearing cones have experienced wear approximately at or beyond a particular wear threshold, the shaft and cone sub-assembly, or components thereof, may be repaired or replaced (414). For example, in some embodiments, the sheave assembly may be removed from the handling operation and disassembled. In some embodiments, the one or more outer endcaps may be removed and the sheave assembly may be removed from the support structure. The one or more sheaves may be removed from the shaft. The one or more inner endcaps may be removed, such that the one or more cones may be removed from the shaft. The worn cone(s) may be repaired or replaced. In other embodiments, the shaft and cone sub-assembly may be replaced as a unit. Once repaired or replaced, the shaft and cone sub-assembly and the sheave assembly may be reassembled and reconnected to the handling system or tensioning system, such that hoisting or tensioning operations may continue with the repaired or replaced components.

Figure 11:
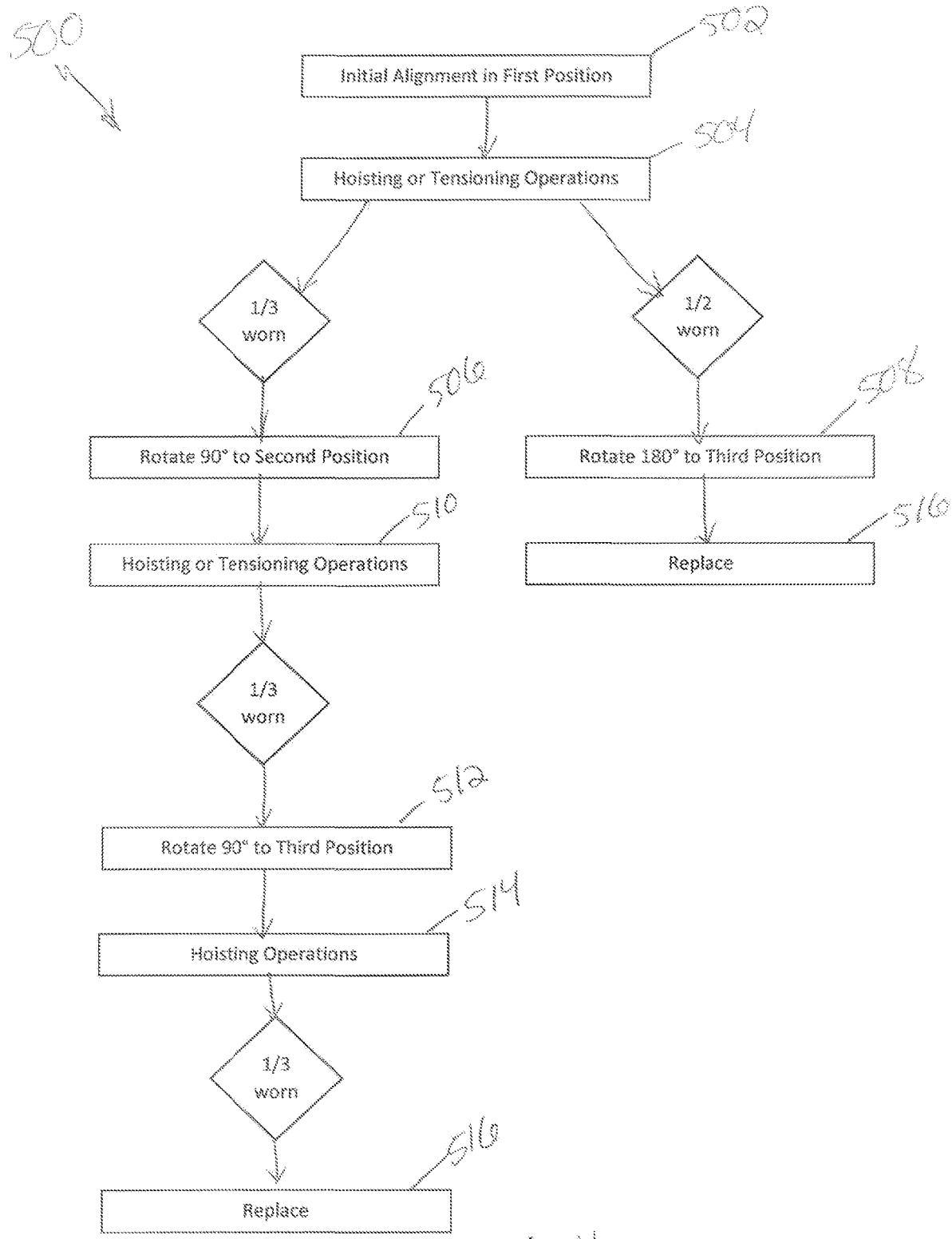
FIG. 11 is another method of using a sheave assembly of the present disclosure according to one or more embodiments.

Turning now to FIG. 11, a particular method 500 of using a sheave assembly of the present disclosure is shown. The method 500 may relate to a shaft and cone sub-assembly having four rotational positions arranged at 90 degree intervals on the sub-assembly. First, second, and third positions may be configured for operational use, and a fourth position may be configured as a reserve position in case of failure. Particularly, the method 500 may include initial alignment of the sheave assembly (502) in a first position, and hoisting or tensioning operations (504). After approximately one third of the useful life of the shaft and cone sub-assembly has passed or after another predetermined period of time has passed, the shaft and cone sub-assembly may be rotated to a second position (506). The second position may be a 90 degree rotation from the first position in some embodiments. In other embodiments, as described above, the second position may be separated by any suitable angle or degree of rotation from the first position. However, in some embodiments, if approximately one half or more of the useful life of the sub-assembly has passed while the sub-assembly was arranged in the first position, or the cones have otherwise experienced a relatively high amount of wear, the shaft and cone sub-assembly may be rotated instead to a third position (508), after which the sub-assembly, or components thereof, may be repaired or replaced (516). Otherwise, where the sub-assembly is successfully rotated to the second position, hoisting or tensioning operations may commence with the sub-assembly in the second position (510). After another approximately one third of the useful life of the shaft and cone sub-assembly has passed or after another predetermined period of time has passed, the shaft and cone sub-assembly may be rotated (512) to a third position. Hoisting or tensioning operations may commence with the sub-assembly in the third position (514). After another approximately one third of the useful life of the shaft and cone sub-assembly has passed or after another predetermined period of time has passed, the shaft and cone sub-assembly, or components thereof, may be repaired or replaced (516). In this way, the final position or fourth position may be a reserve position that is maintained in case of failure, and in particular in case of failure during operations in the third position. That is, instead of rotating to the fourth position after wear on the first, second, and third positions, the sub-assembly may be repaired or replaced. In this way, the sub-assembly may be safely operated such that a reserve position is available at all times.

Figure 13:
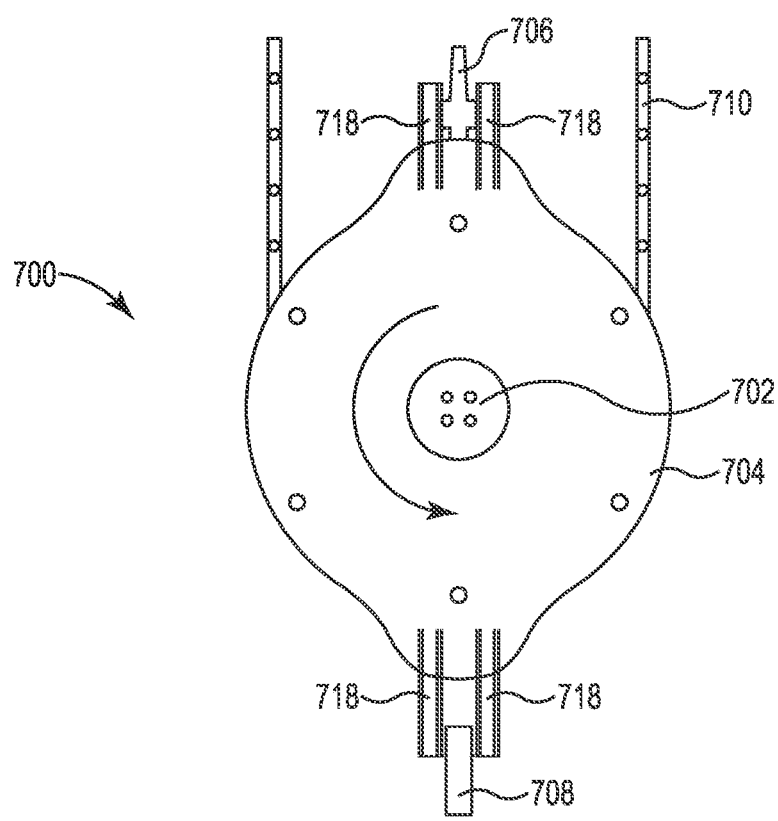
FIG. 13 is a side view of a rotatable traveling block of the present disclosure, according to one or more embodiments.
Figure 14:
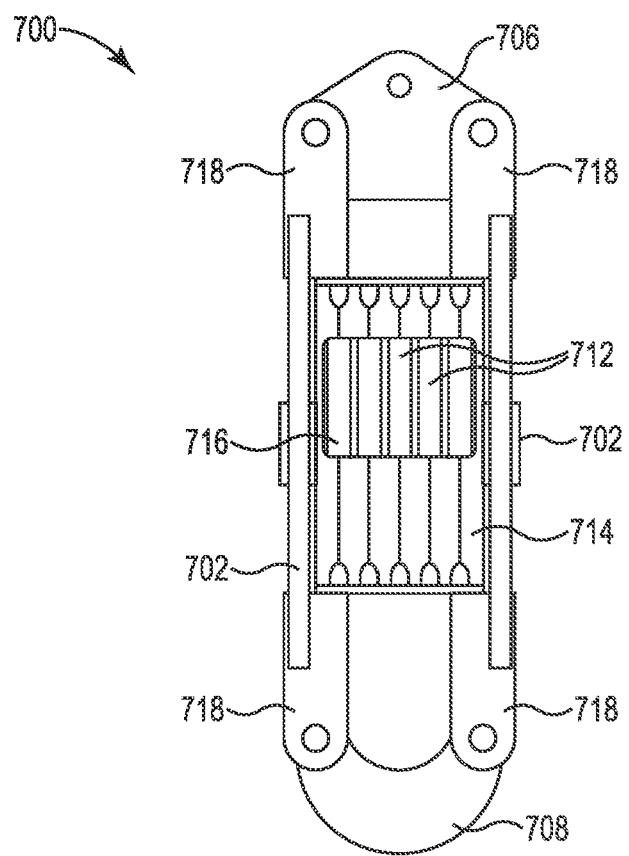
FIG. 14 is an end view of the rotatable traveling block of FIG. 13, according to one or more embodiments.

In some embodiments, a rotatable sheave assembly may be provided. That is, the entire sheave assembly may be configured to rotate in order to redirect loading on the bearings, without necessarily needing a separately rotatable shaft and cone sub-assembly. For example, FIG. 13 shows traveling block 700 of a handling system. The traveling block 700 may have a sheave assembly, wherein a plurality of sheaves may arranged about a central shaft 702, and may be configured to rotate about the shaft with a plurality of bearing cones, cups, and rollers. The sheave assembly may be arranged within a support structure 704. The traveling block 700 may include a hood 706 at one end, such as at a crown block end of the traveling block, and a becket 708 at an opposing end of the traveling block, such as an a wellhead end. In some embodiments, the traveling block 700 may be configured to have generally symmetrical top and bottom connector portions. For example, a pair of hangars 718 may be arranged on each end of the traveling block, such as on a crown block end and a wellhead end. In this way, the hood 706 and becket 708 may be generally reversible, such that either pair of hangars 718 may be configured to receive either the hood or becket. A line 710 may be arranged through the traveling block 700 and may be reeved through the sheaves of the sheave assembly. FIG. 14 illustrates a side view of the traveling block 700, wherein the sheaves 712 of the sheave assembly may be visible. As shown in FIG. 14, the sheave assembly may be arranged within a sheave housing 714 in some embodiments. The sheave housing 714 may have an opening or window 616 through which the line 710 may extend to and from the sheaves 712.

In some embodiments, the traveling block 700, including the sheave assembly, sheave housing 714, and support structure 702 may be configured to be rotatable or flippable. For example, the traveling block 700 may be configured to rotate approximately 180 degrees about a central axis, such as about a central axis aligned with the shaft 702. In other embodiments, the traveling block 700 may be configured to rotate to a lesser or greater degree. The traveling block 700 may be rotatable while the line 710 is reeved therethrough. In some embodiments, the sheave housing 714 may be configured to maintain alignment of the line 710 during rotation of the traveling block. That is, the window 616 may generally help to mitigate the line 710 extending to and from the sheaves 712 from becoming tangled or twisted. In some embodiments, rotation of the traveling block 700 may include removing the hood 706 and becket 708 from the hangars 718, rotating the traveling block about a central axis approximately 180 degrees, and replacing the hood and becket in opposing positions from where they were removed, such that the hood is arranged on a crown block side of the traveling block, and the becket is arranged on a wellhead side of the traveling block, for example. In other embodiments, rotation of the traveling block 700 may include additional or alternative steps. For example, in some embodiments, guards coupled to the traveling block 700 may be removed prior to rotation. Moreover, it may be appreciated that in some embodiments, a different sheave assembly may be configured to be rotatable similar to the traveling block 700. For example, a crown block or other sheave block as part of a handling system on an oil derrick or other handling system may have a rotatable or flappable sheave assembly. In some embodiments, a rotatable or flappable sheave assembly may be arranged as part of a tensioning system, such as a marine riser tensioning system.

While the above-described systems and methods are configured to extend the life of one or more bearing cones, a shaft and cone sub-assembly, and/or a sheave assembly, other systems and methods may additionally be used to help extend the life of the components. For example, during one or more rotations or repositioning operations of the shaft and cone sub-assembly, the sheave assembly may be disassembled such that one or more sheaves, bearing rollers, or other components may be swapped out or changed locations. This may be particularly helpful where, for example, the sheave arrangement is part of a traveling block, and one end of the block handles a "fast line." Swapping out or switching the sheaves, bearing rollers, and/or other components end-for-end with respect to the fast line may help extend the life of the sub-system and system. Additionally or alternatively, bearing grease may be added or refreshed to help extend the life of the bearing components. The systems and methods described herein may allow for these additional maintenance operations to be performed simultaneously with shaft and cone sub-assembly rotation.

It is to be appreciated that devices, components, and concepts described herein are not limited to the particular embodiment(s) with which they are shown or described. That is, devices, components, and concepts described herein with respect to various embodiments may be incorporated into other embodiments. For example, devices, components, and concepts described with respect to the embodiment shown in FIGS. 1-4 may be operably combined with devices, components, and concepts described with respect to the embodiment shown in FIGS. 5-6 and/or 7-8, and vice versa.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A sheave assembly, comprising:
   a first support plate and a second support plate:
   a shaft and cone sub-assembly secured to and supported by the first and second support plates and configured for selective repositioning relative to the first and second support plates, the sub-assembly comprising:
   a sheave shaft extending from the first support plate to the second support plate and configured to be arranged at a center of a sheave;
   a pair of bearing cones arranged on the sheave shaft and configured to interface with a plurality of bearing rollers;
   an inner end cap arranged substantially adjacent the first support plate and configured to clamp the pair of bearing cones in a fixed position relative to the sheave shaft;
   an outer end cap rotationally secured to the sheave shaft and the first support plate with a plurality of fasteners to prevent rotation of the sheave shaft relative to the first support plate, wherein removal of the plurality of fasteners frees the sheave shaft to rotate relative to the first support plate for repositioning bearing cones arranged thereon; and
   a stud extending into the inner end cap and configured to hold the outer endcap in position when the fasteners are removed.

2. The sheave assembly of claim 1, further comprising a sheave arranged about the shaft and cone sub-assembly and corresponding with the pair of bearing cones.

3. The sheave assembly of claim 2, further comprising a plurality of bearing rollers arranged between the sheave and the pair of bearing cones.

4. The sheave assembly of claim 1, wherein the shaft and cone sub-assembly further comprises a plunger configured to engage with the outer end cap or another outer endcap on an opposite side of the shaft and cone sub-assembly.

5. The sheave assembly of claim 4, wherein the plunger is a ratcheting plunger that allows one-directional rotation of the shaft and cone sub-assembly.

6. A drill rig comprising:
a mast; and
a sheave assembly supported by the mast and comprising:
a first support plate and a second support plate;
a shaft and cone sub-assembly secured to and supported by the first and second support plates and configured for selective repositioning relative to the support plate, the sub-assembly comprising:
a sheave shaft extending from the first support plate to the second support plate and configured to be arranged at a center of a sheave;
a pair of bearing cones arranged on the sheave shaft and configured to interface with a plurality of bearing rollers;
an inner end cap arranged substantially adjacent the first support plate and configured to clamp the pair of bearing cones in a fixed position relative to the sheave shaft;
an outer end cap rotationally secured to the sheave shaft and the first support plate with a plurality of fasteners to prevent rotation of the sheave shaft relative to the first support plate, wherein removal of the plurality of fasteners frees the sheave shaft to rotate relative to the first support plate for repositioning the bearing cones arranged thereon; and
a stud extending into the inner end cap and configured to hold the outer endcap in position when the fasteners are removed.

7. The drill rig of claim 6, wherein the sheave assembly comprises a crown block.

8. The drill rig of claim 6, wherein the sheave assembly comprises a riser tensioner.

9. The drill rig of claim 6, wherein the sheave assembly further comprises a sheave arranged about the shaft and cone sub-assembly and corresponding with the pair of bearing cones.

10. The drill rig of claim 9, wherein the sheave assembly further comprises a plurality of bearing rollers arranged between the sheave and the pair of bearing cones.

* * * * *